US012475829B2

(12) United States Patent
Oh et al.

(10) Patent No.: US 12,475,829 B2
(45) Date of Patent: *Nov. 18, 2025

(54) DISPLAY DEVICE INCLUDING FIRST AND SECOND SCAN DRIVERS TO PROVIDE SCAN SIGNALS TO DIFFERENT TRANSISTORS OF A PIXEL CIRCUIT

(71) Applicant: Samsung Display Co., Ltd., Yongin-si (KR)

(72) Inventors: Kyong Hwan Oh, Yongin-si (KR); Ji Hyun Ka, Yongin-si (KR); Ki Myeong Eom, Yongin-si (KR); Hai Jung In, Yongin-si (KR); Jin Jeon, Yongin-si (KR); Won Kyu Kwak, Yongin-si (KR); Hyun Lee, Yongin-si (KR); Hwan Soo Jang, Yongin-si (KR); Jin Tae Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,328

(22) Filed: Jan. 21, 2024

(65) Prior Publication Data

US 2024/0233605 A1 Jul. 11, 2024

Related U.S. Application Data

(63) Continuation of application No. 17/953,288, filed on Sep. 26, 2022, now Pat. No. 11,881,148, which is a (Continued)

(30) Foreign Application Priority Data

Jun. 12, 2019 (KR) ........................ 10-2019-0069637

(51) Int. Cl.
*G09G 3/20* (2006.01)
*G09G 3/3233* (2016.01)

(52) U.S. Cl.
CPC ......... *G09G 3/2092* (2013.01); *G09G 3/3233* (2013.01); *G09G 2310/0251* (2013.01);
(Continued)

(58) Field of Classification Search
CPC ............... G09G 3/2092; G09G 3/3233; G09G 2310/0251; G09G 2310/0267;
(Continued)

(56) References Cited

U.S. PATENT DOCUMENTS 10,083,655 B2 9/2018 Lee et al.
10,319,306 B2 6/2019 Jeong et al.
(Continued)

FOREIGN PATENT DOCUMENTS

CN 109545149 A 3/2019
KR 10-2017-0143049 A 12/2017
(Continued)

OTHER PUBLICATIONS

Notice of Allowance dated Mar. 8, 2021, issued to U.S. Appl. No. 16/890,319.
(Continued)

*Primary Examiner* — Benjamin C Lee
*Assistant Examiner* — Nathan P Brittingham
(74) *Attorney, Agent, or Firm* — Womble Bond Dickinson (US) LLP

(57) ABSTRACT

A display device including pixels coupled to first scan lines, second scan lines, emission control lines, and data lines; a first scan driver to supply a scan signal to each of the first scan lines at a first frequency to drive the display device at a first driving frequency, and to supply the scan signal to each of the first scan lines at a second frequency to drive the
(Continued)

display device at a second driving frequency lower than the first driving frequency; a second scan driver to supply a scan signal to each of the second scan lines at the first frequency to drive the display device at the first driving frequency, and to supply the scan signal to each of the second scan lines at the second frequency to drive the display device at the second driving frequency; an emission driver to supply an emission control signal to each of the emission control lines at the first frequency; and a data driver to supply a data signal to each of the data lines in response to the scan signal supplied to each of the first scan lines.

13 Claims, 21 Drawing Sheets

Related U.S. Application Data continuation of application No. 17/367,396, filed on Jul. 4, 2021, now Pat. No. 11,455,938, which is a continuation of application No. 16/890,319, filed on Jun. 2, 2020, now Pat. No. 11,056,043.

(52) U.S. Cl.
CPC ............... *G09G 2310/0267* (2013.01); *G09G 2310/0275* (2013.01); *G09G 2310/08* (2013.01); *G09G 2340/0435* (2013.01)

(58) Field of Classification Search
CPC ....... G09G 2310/0275; G09G 2310/08; G09G 2340/0435
See application file for complete search history.

(56) References Cited

U.S. PATENT DOCUMENTS

| | | | | |
|---|---|---|---|---|
| 10,861,393 | B2 | 12/2020 | Kim et al. | |
| 10,861,409 | B2 | 12/2020 | Lee et al. | |
| 2005/0140605 | A1 | 6/2005 | Jung | |
| 2007/0222718 | A1 | 9/2007 | Takahara | |
| 2008/0012842 | A1 | 1/2008 | Mori | |
| 2010/0128065 | A1 | 5/2010 | Lee et al. | |
| 2011/0006301 | A1* | 1/2011 | Yamazaki | H01L 27/124 257/E29.296 |
| 2011/0057917 | A1 | 3/2011 | Ryu et al. | |
| 2011/0254816 | A1* | 10/2011 | Umezaki | G09G 3/344 345/204 |
| 2013/0100173 | A1 | 4/2013 | Chaji et al. | |
| 2014/0184484 | A1 | 7/2014 | Miyake et al. | |
| 2015/0348466 | A1 | 12/2015 | Park et al. | |
| 2015/0356899 | A1 | 12/2015 | Yamanaka et al. | |
| 2015/0364083 | A1 | 12/2015 | Jeon | |
| 2016/0019856 | A1 | 1/2016 | Tanaka et al. | |
| 2017/0092191 | A1 | 3/2017 | An et al. | |
| 2017/0092193 | A1 | 3/2017 | Na et al. | |
| 2017/0177125 | A1 | 6/2017 | Kim et al. | |
| 2018/0005572 | A1 | 1/2018 | Ka et al. | |
| 2018/0151115 | A1 | 5/2018 | Tseng et al. | |
| 2018/0158396 | A1 | 6/2018 | Lee et al. | |
| 2018/0286307 | A1* | 10/2018 | Kim | G09G 3/3283 |
| 2018/0293939 | A1 | 10/2018 | Kim et al. | |
| 2018/0293944 | A1 | 10/2018 | Kim et al. | |
| 2019/0129269 | A1* | 5/2019 | Ogawa | G02F 1/133553 |
| 2019/0288055 | A1* | 9/2019 | Sakai | G09G 3/3233 |
| 2019/0295470 | A1 | 9/2019 | Kim et al. | |
| 2020/0035183 | A1* | 1/2020 | Hou | G09G 3/3674 |
| 2020/0105193 | A1 | 4/2020 | Qing | |
| 2020/0202779 | A1* | 6/2020 | Chang | G09G 3/3266 |

FOREIGN PATENT DOCUMENTS

| | | |
|---|---|---|
| KR | 10-2018-0004370 | 1/2018 |
| KR | 10-2018-0112158 | 10/2018 |
| KR | 10-2018-0131682 | 12/2018 |
| KR | 10-2019-0034375 | 4/2019 |

OTHER PUBLICATIONS

Notice of Allowance dated May 6, 2022, in U.S. Appl. No. 17/367,396.
Notice of Allowance dated Aug. 12, 2022, in U.S. Appl. No. 17/367,396.
Notice of Allowance dated Mar. 22, 2023 , in U.S. Appl. No. 17/953,288.
Notice of Allowance dated Jul. 26, 2023, in U.S. Appl. No. 17/953,288.
Notice of Allowance dated Nov. 16, 2023, in Korean Patent Application No. 10-2019-0069637 (with English translation).
Notice of Allowance dated Dec. 4, 2023, in U.S. Appl. No. 17/953,288.

* cited by examiner

DISPLAY DEVICE INCLUDING FIRST AND SECOND SCAN DRIVERS TO PROVIDE SCAN SIGNALS TO DIFFERENT TRANSISTORS OF A PIXEL CIRCUIT

CROSS-REFERENCE TO RELATED APPLICATION

This application is a continuation of U.S. patent application Ser. No. 17/953,288, filed on Sep. 26, 2022, which is a continuation of U.S. patent application Ser. No. 17/367,396, filed on Jul. 4, 2021, issued as U.S. Pat. No. 11,455,938, which is a continuation of U.S. patent application Ser. No. 16/890,319 filed on Jun. 2, 2020, issued as U.S. Pat. No. 11,056,043, each of which claims priority from and the benefit of Korean Patent Application No. 10-2019-0069637, filed on Jun. 12, 2019, both of which are hereby incorporated by reference for all purposes as if fully set forth herein.

BACKGROUND

Field

Exemplary implementations of the invention relate generally to an electronic apparatus, and. more particularly, to a display device and a method of driving the display device.

Discussion of the Background

A display device displays an image on a display panel using control signals applied from an external device.

The display device may include a plurality of pixels. Each of the pixels may include a plurality of transistors, a light emitting element electrically coupled to the transistors, and a capacitor. The transistors may be turned on in response to respective signals provided through lines, thus generating driving current. The light emitting element may emit light in response to the driving current.

To enhance the driving efficiency of the display device, there is a need to reduce the power consumption of the display device. For example, the power consumption of the display device may be reduced by reducing a driving frequency when a static image is displayed.

The above information disclosed in this Background section is only for understanding of the background of the inventive concepts, and, therefore, it may contain information that does not constitute prior art.

SUMMARY

Display devices constructed according to exemplary implementations of the invention are capable of reducing the power consumption and improving the image quality in a low-frequency driving mode by, in part, utilizing various pixel structures included in the display device.

For example, toggling of scan signals in a low-frequency driving mode may be reduced, and an on-bias may be periodically applied to a first transistor. Hence, the power consumption may be reduced, and the image quality may be improved. Furthermore, third transistors (and fourth transistors) included in a plurality of pixel lines may share a scan signal, where the number of stages included in a second scan driver (and a third scan driver) may be reduced. Consequently, the power consumption may be reduced. Moreover, initialization power supplies coupled to fourth and seventh transistors of pixels may be separated from each other, so that the image quality may be further improved.

Additional features of the inventive concepts will be set forth in the description which follows, and in part will be apparent from the description, or may be learned by practice of the inventive concepts.

According to one aspect of the invention, a display device includes: pixels coupled to first scan lines, second scan lines, emission control lines, and data lines; a first scan driver to supply a scan signal to each of the first scan lines at a first frequency to drive the display device at a first driving frequency, and to supply the scan signal to each of the first scan lines at a second frequency to drive the display device at a second driving frequency lower than the first driving frequency; a second scan driver to supply a scan signal to each of the second scan lines at the first frequency to drive the display device at the first driving frequency, and to supply the scan signal to each of the second scan lines at the second frequency to drive the display device at the second driving frequency; an emission driver to supply an emission control signal to each of the emission control lines at the first frequency; and a data driver to supply a data signal to each of the data lines in response to the scan signal supplied to each of the first scan lines.

The first frequency may be substantially equal to the first driving frequency.

The second frequency can be substantially equal to the second driving frequency.

When the display device may be driven at the second driving frequency, the first scan driver and the second scan driver can be configured to supply the scan signals during a first period, and when the display device may be driven at the second driving frequency, the first scan driver and the second scan driver may be configured not to supply the scan signals during a second period.

The second period may be set to a period longer than the first period.

A timing controller can supply a first gate start pulse to the first scan driver, can supply a second gate start pulse to the second scan driver, and can supply an emission start pulse to the emission driver.

When the display device may be driven at the first driving frequency, the timing controller can be configured to output the first and the second gate start pulses at the first frequency, and when the display device may be driven at the second driving frequency, the timing controller can be configured to output the first and the second gate start pulses at the second frequency.

The timing controller may be configured to output the emission start pulse at the first frequency regardless of driving frequency.

A pixel disposed on an i-th horizontal line among the pixels with i being a natural number can include: a light emitting element including a first electrode, and a second electrode coupled to a second power supply; a first transistor including a first electrode coupled to a first node electrically connected to a first power supply to control driving current based on a voltage of a second node; a second transistor coupled between a corresponding data line and the first node, and configured to be activated by the scan signal supplied to an i-th first scan line; a third transistor coupled between the second node and a third node coupled to a second electrode of the first transistor, and configured to be activated by the scan signal supplied to an i-th second scan line; a fourth transistor coupled between the second node and a first initialization power supply, and configured to be activated by the scan signal supplied to an i−1-th second scan line; a fifth transistor coupled between the first power supply and the first node, and configured to be deactivated by the emission control signal supplied to an i-th emission control line; a sixth transistor coupled to the third node and the first electrode of the light emitting element, and configured to be deactivated the emission control signal; and a storage capacitor coupled between the first power supply and the second node.

The pixel disposed on the i-th horizontal line further may include a seventh transistor coupled between a second initialization power supply and the first electrode of the light emitting element, the seventh transistor being configured to be activated by the emission control signal.

A voltage of the first initialization power supply can differ from a voltage of the second initialization power supply.

The voltage of the first initialization power supply may be greater than the voltage of the second initialization power supply.

Each of the first transistor, the second transistor, the fifth transistor, and the sixth transistor can include a P-type transistor, and each of the third transistor, the fourth transistor, and the seventh transistor can include an N-type oxide semiconductor transistor.

A power supply line disposed under the light emitting elements may transmit a voltage of the second power supply to the light emitting elements.

The pixel disposed on the i-th horizontal line may further include a seventh transistor coupled between the power supply line and the first electrode of the light emitting element, the seventh transistor being configured to be activated by the emission control signal.

A pixel disposed on an i-th horizontal line with i being a natural number among the pixels can have: a light emitting element, including a first electrode and a second electrode, coupled to a second power supply; a first transistor including a first electrode coupled to a first node electrically connected to a first power supply to control driving current based on a voltage of a second node; a second transistor coupled between a corresponding data line and the first node, and configured to be activated by the scan signal supplied to an i-th first scan line; a third transistor coupled between the second node and a third node coupled to a second electrode of the first transistor, and configured to be activated by the scan signal supplied to an i-th second scan line; a fourth transistor coupled between the second node and a first initialization power supply, and configured to be activated by the scan signal supplied to an i-q-th second scan line with q being a natural number; and a fifth transistor coupled between the first power supply and the first node, and configured to be deactivated by the emission control signal supplied to an i-th emission control line.

The first scan driver may include n stages with n being a natural number greater than 1, dependently coupled to each other, and the second scan driver can include k stages with k being a natural number less than n dependently coupled to each other.

A pulse width of the scan signal to be supplied to the second scan lines may be greater than a pulse width of the scan signal to be supplied to the first scan lines.

Each of the stages included in the second scan driver may be configured to simultaneously supply the scan signal to at least two of the second scan lines.

A portion of the scan signal to be supplied to the i-th second scan line can overlap with the scan signal to be supplied to the i-th first scan line and the scan signal supplied to an i+1-th first scan line.

The scan signal to be supplied to the third transistor of the pixel disposed on the i-th horizontal line may be delayed by four or more horizontal periods compared to the scan signal to be supplied to the fourth transistor of the pixel disposed on the i-th horizontal line.

A pixel disposed on an i-th horizontal line with i being a natural number among the pixels can include: a light emitting element including a first electrode, and a second electrode coupled to a second power supply; a first transistor including a first electrode coupled to a first node electrically connected to a first power supply to control driving current based on a voltage of a second node; a second transistor coupled between a data line and the first node, and configured to be activated by a first scan signal supplied to an i-th first scan line; a third transistor coupled between the second node and a third node coupled to a second electrode of the first transistor, and configured to be activated by a second scan signal supplied to an i-th second scan line; a fourth transistor coupled between the second node and a first initialization power supply, and configured to be activated by a third scan signal supplied to an i-th third scan line; and a fifth transistor coupled between the first power supply and the first node, and configured to be deactivated by the emission control signal supplied to an i-th emission control line, where the first scan driver may be configured to supply the first scan signal to the first scan lines, and the second scan driver may be configured to supply the second scan signal to the second scan lines.

A third scan driver to supply when the display device may be driven at the first driving frequency, the third scan signal to third scan lines connected to the pixels at the first frequency, and to supply, when the display can be driven at the second driving frequency, the third scan signal to the third scan lines at the second frequency.

The first scan driver may include n stages, with n being a natural number greater than 1 dependently coupled to each other, and each of the second scan driver and the third scan driver may include k stages with k being a natural number less than n dependently coupled to each other.

The third scan driver can be configured to supply the third scan signal to the i-th third scan line, and after q horizontal periods delayed with q being a natural number of 4 or more, the second scan driver can be configured to supply the second scan signal to the i-th second scan line, and a pulse width of the second scan signal can substantially equal a pulse width of the third scan signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
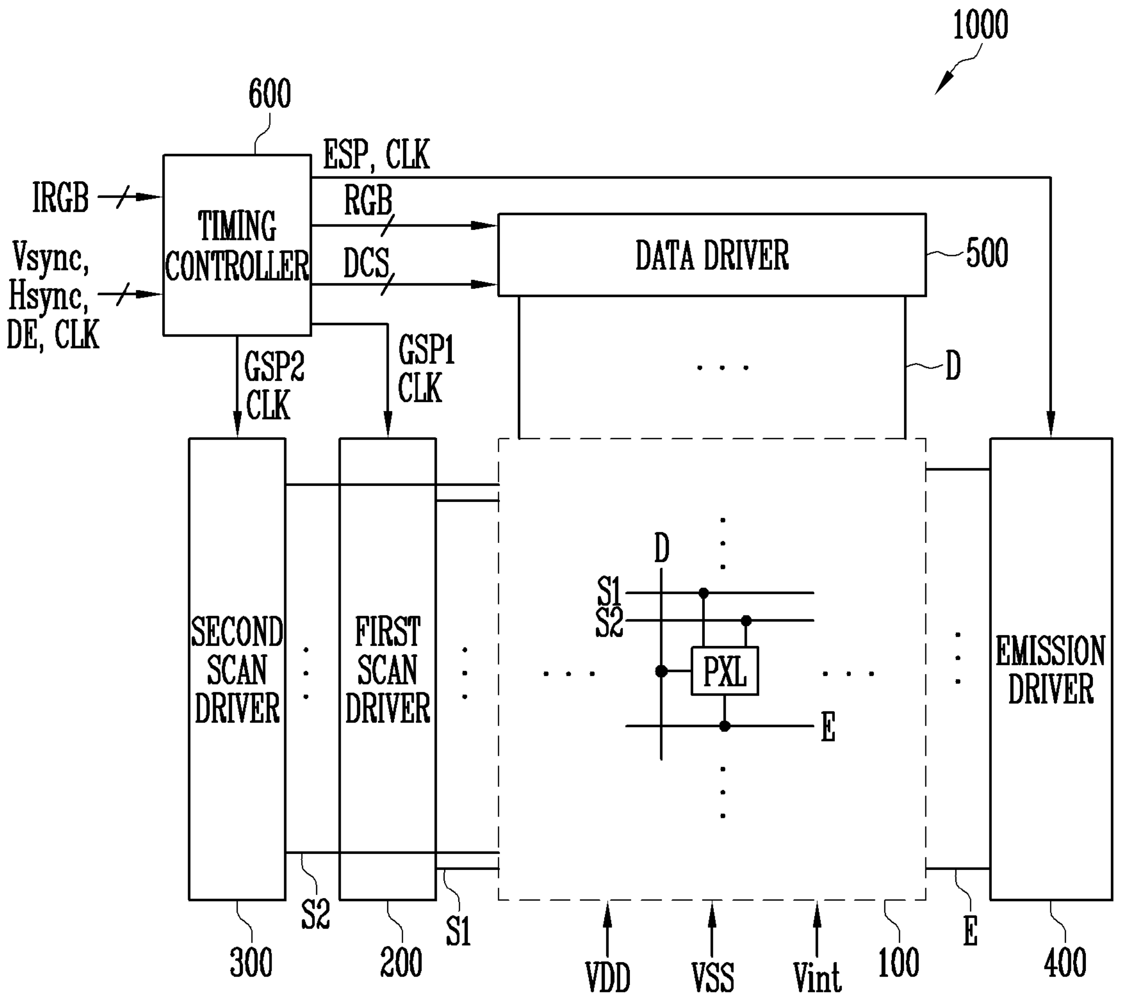
FIG. 1 is a block diagram illustrating an exemplary embodiment of a display device constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram illustrating an exemplary embodiment of a display device 1000 constructed according to principles of the invention.

Referring to FIG. 1, the display device 1000 may include a pixel unit 100, a first scan driver 200, a second scan driver 300, an emission driver 400, a data driver 500, and a timing controller 600.

The display device 1000 may display images using various driving frequencies depending on driving conditions. In an embodiment, the display device 1000 may adjust, depending on driving conditions, output frequencies of the first and second scan drivers 200 and 300 and an output frequency of the data driver 500 corresponding to the output frequencies of the first and second scan drivers 200 and 300. For example, the display device 1000 may display images in response to various driving frequencies ranging from about 1 Hz to about 120 Hz.

The timing controller 600 may be supplied with input image data IRGB and timing signals Vsync, Hsync, DE, and CLK from a host system such as an application processor (AP) through a predetermined interface.

The timing controller 600 may generate a data driving control signal DCS based on input image data IRGB, and timing signals such as a vertical synchronous signal Vsync, a horizontal synchronous signal Hsync, a data enable signal DE, and a clock signal CLK. The data driving control signal DCS may be supplied to the data driver 500. The timing controller 600 may rearrange input image data IRGB and supply the rearranged input image data IRGB to the data driver 500.

The timing controller 600 may supply gate start pulses GSP1 and GSP2 and clock signals CLK to the first scan driver 200 and the second scan driver 300 based on the timing signals.

The timing controller 600 may supply an emission start pulse ESP and clock signals CLK to the emission driver 400, based on timing signals. The emission start pulse ESP may control a first timing of an emission control signal. Clock signals may be used to shift the emission start pulse.

The first gate start pulse GSP1 may control a first timing of a scan signal to be supplied from the first scan driver 200. The clock signals CLK may be used to shift the first gate start pulse GSP1.

The second gate start pulse GSP2 may control a first timing of a scan signal to be supplied from the second scan driver 300. The clock signals CLK may be used to shift the second gate start pulse GSP2.

The data driver 500 may supply data signals to data lines D in response to the data driving control signal DCS. The data signals supplied to the data lines D may be supplied to pixels PXL selected by scan signals The data driver 500 may supply data signals to the data lines D during a frame period in response to a driving frequency. For example, the data driver 500 may supply data signals to the data lines D during a frame period when the display device 1000 is driven at a first driving frequency. Here, the data signals to be supplied to the data lines D may be synchronized with scan signals to be supplied to the first scan lines S1 and the second scan lines S2.

In an embodiment, when the display device 1000 is driven at the second driving frequency lower than the first driving frequency, the data driver 500 may supply data signals to the data lines D during a first period of each frame period, and supply an arbitrary reference voltage to the data lines D during a second period other than the first period. During the first period, scan signals may be supplied to the second scan lines S2.

In some embodiments, the reference voltage may be set to a specific voltage within a voltage range of data signals. For example, the reference voltage may be set to a data voltage having a black gray scale. Furthermore, as a horizontal period passes or a frame passes, the reference voltage may be changed within the voltage range of the data signals.

Alternatively, in some embodiments, the data driver 500 may not supply a data signal or voltage to the data lines D during the second period.

In addition, the first period may refer to a period in which scan signals are supplied to all of the first scan lines S1 and the second scan lines S2, and emission control signals are supplied to the emission control lines E. The second period may refer to a period in which emission control signals are supplied to the emission control lines E.

The first scan driver 200 may supply scan signals to the first scan lines S1 in response to the first gate start pulse GSP1. In one exemplary embodiment, the first scan driver 200 may supply scan signals at a first frequency, which may substantially equal a first driving frequency. For example, the first scan driver 200 may successively supply scan signals to the first scan lines S1. Here, a scan signal to be supplied from the first scan driver 200 may be set to a gate-on voltage so that a transistor included in the pixel PXL may be turned on.

The second scan driver 300 may supply scan signals to the second scan lines S2 in response to the second gate start pulse GSP2. In one exemplary embodiment, the second scan driver 300 may supply scan signals at a second frequency, which may substantially equal a second driving frequency. For example, the second scan driver 300 may successively supply scan signals to the second scan lines S2. Here, a scan signal to be supplied from the second scan driver 300 may be set to a gate-on voltage so that a transistor included in the pixel PXL may be turned on.

The first scan driver 200 and the second scan driver 300 may control scan signals to be supplied to the scan lines S1 and S2 in response to the driving frequency. For example, when the display device is driven at the first driving frequency, the first scan driver 200 may sequentially supply one or more scan signals to each of the first scan lines S1 during each frame period. Likewise, when the display device is driven at the first driving frequency, the second scan driver 300 may sequentially supply one or more scan signals to each of the second scan lines S2 during each frame period. Here, a scan signal to be supplied to an i-th (i is a natural number) first scan line S1*i* may overlap with a scan signal to be supplied to an i-th second scan line S2*i*. In other words, the scan signal to be supplied to the i-th first scan line S1*i* may be supplied in synchronization with the scan signal to be supplied to the i-th second scan line S2*i*.

In an embodiment, when the display device 1000 is driven at the second driving frequency, the first scan driver 200 supplies scan signals to the first scan lines S1 during the first period. For example, the first scan driver 200 may supply at least one scan signal to each of the first scan lines S1 during the first period.

When the display device 1000 is driven at the second driving frequency, the second scan driver 300 supplies scan signals to the second scan lines S2 during the first period. For example, the second scan driver 300 may supply at least one scan signal to each of the second scan lines S2 during the first period. Here, a scan signal to be supplied to an i-th first scan line S1*i* during the first period may overlap with a scan signal to be supplied to an i-th second scan line S2*i*.

In an embodiment, when the display device 1000 is driven at the second driving frequency, the first and second scan driver 200 and 300 may not supply signals to the scan lines S1 and S2. Hence, in a driving mode using a low-frequency less than about 60 Hz, the power consumption may be markedly reduced.

The emission driver 400 may supply emission control signals to emission control lines E in response to the emission start pulse ESP. For example, the emission driver 400 may sequentially supply the emission control signals to the emission control lines E. If the emission control signals are sequentially supplied to the emission control lines E, the pixels PXL may be not-emitted on a horizontal line basis. For this operation, the emission control signal may be set to a gate-off voltage so that transistors included in the pixels PXL may be turned off. In an embodiment, the emission driver 400 may supply an emission control signal to an i-th emission control line Ei such that the emission control signal overlaps with scan signals to be supplied to an i−1-th first scan line S1*i*−1 (and/or an i−1-th second scan line S2*i*−1 and an i-th first scan line S1*i* (and/or an i-th second scan line S2*i*).

In an embodiment, the emission driver 400 may supply emission control signals to the emission control lines E in response to the maximum driving frequency of the display device 1000. For example, an output frequency at which the emission driver 400 outputs the emission control signals may be constant regardless of variation of the driving frequency.

When the driving frequency is reduced, the number of times the emission driver 400 repeatedly performs an operation of supplying emission control signals to the respective emission control lines E during each frame period may be increased.

The pixel unit 100 may include pixels PXL which are coupled with the data lines D, the scan lines S1 and S2, and the emission control lines E. The pixels PXL may be supplied with voltages of a first power supply VDD, a second power supply VSS, and an initialization power supply Vint from external devices.

Each pixel PXL may be selected when a scan signal is supplied to the corresponding scan lines S1 and S2 coupled with the pixel PXL, and then be supplied with a data signal from the corresponding data line D. The pixel PXL supplied with the data signal may control, in response to the data signal, the amount of current (driving current) flowing from the first power supply VDD to the second power supply VSS via a light emitting element. The light emitting element may generate light having a predetermined luminance in response to the amount of current. The time for which each pixel PXL emits light may be controlled by an emission control signal supplied from the corresponding emission control line E coupled with the pixel PXL.

In addition, the pixels PXL may be coupled to one or more first scan lines S1, one or more second scan lines S2, and one or more emission control lines E depending on the structure of a pixel circuit. In other words, in an embodiment, signal lines S1, S2, E, and D to be coupled to the pixel PXL may be set to various forms depending on the circuit structure of the pixel PXL.

Figure 2:
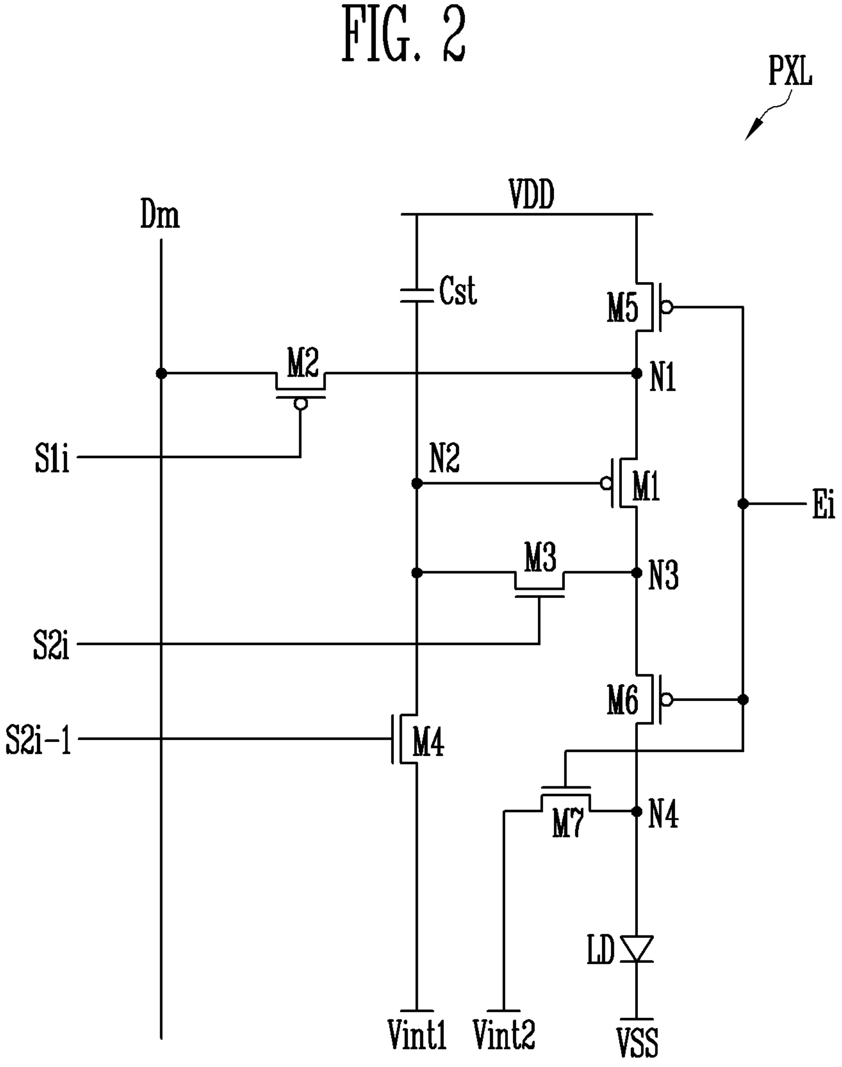
FIG. 2 is a circuit diagram illustrating an exemplary embodiment of a representative pixel included in the display device of FIG. 1.

FIG. 2 is a circuit diagram illustrating an exemplary embodiment of a representative pixel PXL included in the display device of FIG. 1.

Referring to FIG. 2, the pixel PXL may include a light emitting element LD, first to seventh transistors M1 to M7, and a storage capacitor Cst.

The light emitting element LD may include a first electrode (either an anode electrode or a cathode electrode) coupled to a fourth node N4, and a second electrode (the other one of the cathode electrode and the anode electrode) coupled to the second power supply VSS. The light emitting element LD may emit light having a predetermined luminance corresponding to current supplied from the first transistor M1.

In an embodiment, the light emitting element LD may be an organic light emitting diode including an organic light emitting layer. In an embodiment, the light emitting element LD may be an inorganic light emitting element formed of inorganic material. The light emitting element LD may have a shape in which a plurality of inorganic light emitting elements are coupled in parallel and/or series between the second power supply VSS and the fourth node N4.

The first transistor (or the driving transistor) M1 may include a first electrode coupled to a first node N1, and a second electrode coupled to a third node N3. A gate electrode of the first transistor M1 is coupled to the second node N2. The first transistor M1 may control, in response to the voltage of the second node N2, the amount of current flowing from the first power supply VDD to the second power supply VSS via the light emitting element LD. To this end, the first power supply VDD may be set to a voltage higher than the second power supply VSS.

The second transistor M2 may be coupled between a data line Dm and the first node N1. A gate electrode of the second transistor M2 may be coupled to an i-th first scan line S1*i*. When a scan signal is supplied to the i-th first scan line S1*i*, the second transistor M2 may be turned on to electrically couple the data line Dm with the first node N1.

The third transistor M3 may be coupled between the second electrode (i.e., the third node N3) of the first transistor M1 and the second node N2. A gate electrode of the third transistor M3 may be coupled to the i-th second scan line S2*i*. When a scan signal is supplied to the i-th second scan line S2*i*, the third transistor M3 may be turned on to electrically connect the second electrode of the first transistor M1 to the second node N2. Therefore, if the third transistor M3 is turned on, the first transistor M1 may be connected in the form of a diode.

The fourth transistor M4 is coupled between the second node N2 and a first initialization power supply Vint1. A gate electrode of the fourth transistor M4 is coupled to the i-1-th second scan line S2*i*−1. When a scan signal is supplied to the i-1-th second scan line S2*i*−1, the fourth transistor M4 is turned on so that the voltage of the first initialization power supply Vint1 may be supplied to the second node N2.

In an embodiment, the voltage of the first initialization power supply Vint1 is set to a voltage lower than a data signal to be supplied to the data line Dm. Therefore, when the fourth transistor M4 is turned on, the gate voltage of the first transistor M1 may be initialized to the voltage of the first initialization power supply Vint1, and the first transistor M1 may have an on-bias state (i.e., the first transistor M1 may be initialized to an on-bias state).

The fifth transistor M5 is coupled between the first power supply VDD and the first node N1. A gate electrode of the fifth transistor M5 may be coupled to the emission control line Ei. The fifth transistor M5 may be turned off when an emission control signal is supplied to the emission control line Ei, and may be turned on in the other cases.

The sixth transistor M6 is coupled between the second electrode (i.e., the third node N3) of the first transistor M1 and the first electrode (i.e., the fourth node N4) of the light emitting element LD. A gate electrode of the sixth transistor M6 may be coupled to the emission control line Ei. The sixth transistor M6 may be turned off when an emission control signal is supplied to the emission control line Ei, and may be turned on in the other cases.

The seventh transistor M7 is coupled between a second initialization power supply Vint2 and the fourth node N4. In an embodiment, a gate electrode of the seventh transistor M7 may be coupled to the i-th emission control line Ei.

The seventh transistor M7 may be turned on when an emission control signal is supplied to the emission control line Ei, and may be turned off in the other cases. In other words, the seventh transistor M7 that is an N-type transistor may be turned on or off on the contrary to that of the fifth and sixth transistors M5 and M6.

When an emission control signal is supplied (i.e., during a non-emission period), the seventh transistor M7 is turned on so that the voltage of the second initialization power supply Vint2 may be supplied to the first electrode of the light emitting element LD.

If the voltage of the first initialization power supply Vint2 is supplied to the first electrode of the light emitting element LD, a parasitic capacitor of the light emitting element LD may be discharged. As residual voltage charged into the parasitic capacitor is discharged (removed), undesired fine emission may be prevented. Therefore, the black expression performance of the pixel PXL may be enhanced.

The first initialization power supply Vint1 and the second initialization power supply Vint2 may generate different voltages. In other words, a voltage of initializing the second node N2 and a voltage of initializing the fourth node N4 may be set to different values.

During a low frequency operation having a relatively long frame period, if the voltage of the first initialization power supply Vint1 to be supplied to the second node N2 is excessively low, the hysteresis of the first transistor M1 may excessively vary during the corresponding frame period. Such hysteresis may cause a flicker phenomenon in the low-frequency driving mode. Therefore, in the low-frequency driving mode of the display device, the voltage of the first initialization power supply Vint1 may be required to be higher than the voltage of the second power supply VSS.

However, if the voltage of the second initialization power supply Vint2 to be supplied to the fourth node N4 is higher than a predetermined reference voltage, the voltage of the parasitic capacitor of the light emitting element LD may be charged rather than being discharged. Therefore, the voltage of the second initialization power supply Vint2 is required to be lower than the predetermined reference voltage. For example, the voltage of the second initialization power supply Vint2 may be similar to the voltage of the second power supply VSS. However, this is only for illustrative purposes. For example, depending on driving conditions of the display device, the voltage of the second initialization power supply Vint2 may be higher or lower than the voltage of the second power supply VSS.

In other words, to improve the driving performance of the pixel PXL, a voltage to be supplied to the second node N2 through the fourth transistor M4 is required to differ from a voltage to be supplied to the fourth node N4 through the seventh transistor M7.

In various embodiments, the pixels PXL included in the display device 1000 may be coupled with the first initialization power supply Vint1 and the second initialization power supply Vint2 that provide different voltages. Therefore, since a voltage of initializing the first transistor M1 and a voltage of initializing the light emitting element LD are independently determined, a flicker phenomenon or emission error may be prevented or mitigated.

However, this is only for illustrative purposes, and one electrode of the fourth transistor M4 and one electrode of the seventh transistor M7 may be coupled to a common initialization power supply.

The storage capacitor Cst may be coupled between the first power supply VDD and the second node N2. The storage capacitor Cst may store a voltage applied to the second node N2.

The first transistor M1, the second transistor M2, the fifth transistor M5, and the sixth transistor M6, each may be formed of a poly-silicon semiconductor transistor. For example, the first transistor M1, the second transistor M2, the fifth transistor M5, and the sixth transistor M6, each may include a poly-silicon semiconductor layer as an active layer (channel). The poly-silicon semiconductor layer may be formed through a low temperature poly-silicon (LTPS) process. Furthermore, the first transistor M1, the second transistor M2, the fifth transistor M5, and the sixth transistor M6 each may be a P-type transistor. Therefore, a gate-on voltage for turning on the first transistor M1, the second transistor M2, the fifth transistor M5, or the sixth transistor M6 may have a logic low level.

Since a poly-silicon semiconductor transistor has an advantage of a high response speed, the poly-silicon semiconductor transistor may be applied in a switching element in which a high-speed switching operation is required.

The third transistor M3, the fourth transistor M4, and the seventh transistor M7 each may be formed of an oxide semiconductor transistor. For example, the third transistor M3, the fourth transistor M4, and the seventh transistor M7 each may be formed of an N-type oxide semiconductor transistor, and include an oxide semiconductor layer as an active layer. Hence, a gate-on voltage for turning on the third transistor M3, the fourth transistor M4, or the seventh transistor M7 may have a logic high level.

An oxide semiconductor transistor may be produced through a low-temperature process, and have low charge mobility compared to that of the poly-silicon semiconductor transistor. In other words, the oxide semiconductor transistor may have excellent off-current characteristics. Therefore, if each of the third transistor M3 and the fourth transistor M4 is formed of an oxide semiconductor transistor, leakage current from the second node N2 may be minimized. Thereby, the display quality of the display device may be enhanced. Since the seventh transistor M7 is formed of an oxide semiconductor transistor, leakage current from the fourth node N4 may be minimized, whereby the display quality of the display device may be enhanced.

In the case where the seventh transistor M7 is a P-type transistor, the logic low level of the voltage for turning on the seventh transistor M7 is required to be lower than the voltage of the second initialization power supply Vint2. However, as illustrated in FIG. 2, if the seventh transistor M7 is formed of an N-type transistor, the logic low level of a signal for controlling the seventh transistor M7 may be relatively increased. Therefore, the gate electrode of the seventh transistor M7 may be coupled to the emission control line Ei, and the seventh transistor M7 may be controlled by an emission control signal.

Consequently, as the seventh transistor M7 is controlled by an emission control signal, the power consumption is reduced. In addition, since the second initialization power supply Vint2 having a relatively low potential is applied to the fourth node N4, the black expression performance may be further enhanced.

Figure 3A:
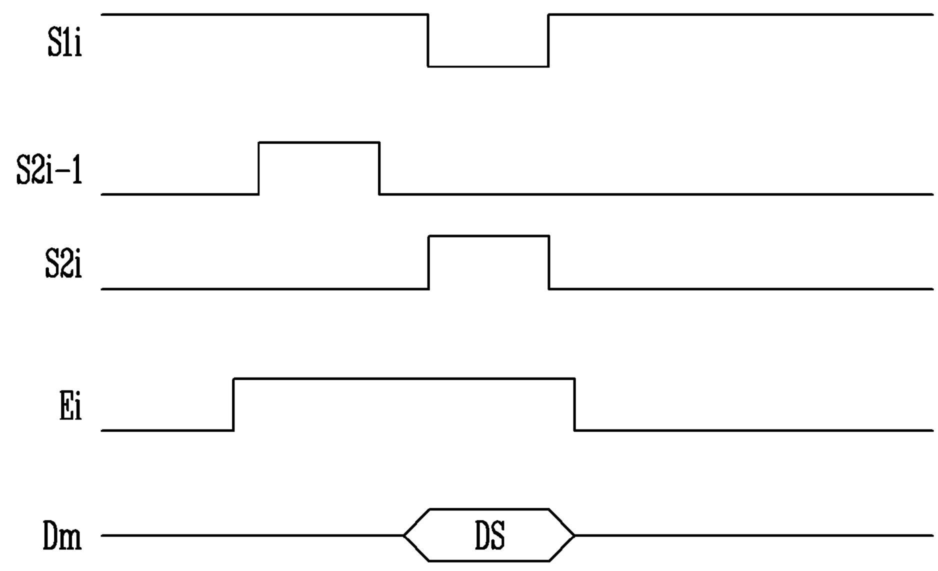
FIG. 3A is an exemplary timing diagram illustrating an example of an operation of the pixel of FIG. 2.

FIG. 3A is an exemplary timing diagram illustrating an example of an operation of the pixel PXL of FIG. 2.

Referring to FIGS. 2 and 3A, in the case where the display device 1000 is driven at the first driving frequency, the pixel PXL may be supplied with signals for displaying images at the first driving frequency.

In the case where the display device 1000 is driven at the second driving frequency lower than the first driving frequency, the pixel PXL may be supplied with signals for displaying images at the second driving frequency.

A gate-on voltage of a scan signal to be supplied to each of the second scan lines S2*i* and S2*i*−1 coupled to the third, fourth, and seventh transistors M3, M4, and M7 each of which is an N-type transistor may have a logic high level. A gate-on voltage of a scan signal to be supplied to each of the first scan lines S1*i* and S1*i*+1 coupled to the first, second, fifth, and sixth transistors M1, M2, M5, and M6 each of which is a P-type transistor may have a logic low level.

First, an emission control signal is supplied to the emission control line Ei. If the emission control signal is supplied to the emission control line Ei, the fifth and the sixth transistors M5 and M6 are turned off. If the fifth and sixth transistors M5 and M6 are turned off, the pixel PXL is set to a non-emission state.

Furthermore, if the emission control signal is supplied to the emission control line Ei, the seventh transistor M7 is turned on. If the seventh transistor M7 is turned on, the voltage of the second initialization power supply Vint2 may be supplied to the first electrode (i.e., the fourth node N4) of the light emitting element LD. Thereby, the residual voltage that remains in the parasitic capacitor of the light emitting element LD may be discharged.

While all of the second to fourth transistors M2 to M4 are turned off, if the emission control signal to be supplied to the emission control line Ei makes a transition from a logic low level to a logic high level, the gate voltage of the fifth transistor M5 is increased. Therefore, when the emission control signal is supplied to the emission control line Ei, the voltage of the first electrode (i.e., the first node N1) of the first transistor M1 may be increased by voltage coupling, and an on-bias may be applied to the first transistor M1.

Thereafter, a scan signal is supplied to the i−1-th second scan line S2*i*−1. If the scan signal is supplied to the i−1-th second scan line S2*i*−1, the fourth transistor M4 may be turned on. If the fourth transistor M4 is turned on, the voltage of the first initialization power source Vint1 is supplied to the second node N2.

Thereafter, scan signals are supplied to the i-th first scan line S1*i* and the i-th second scan line S2*i*. If a scan signal is supplied to the i-th second scan line S2*i*, the third transistor M3 may be turned on. If the third transistor M3 is turned on, the first transistor M1 may be connected in the form of a diode, and the threshold voltage of the first transistor M1 may be compensated for.

If a scan signal is supplied to the i-th first scan line S1*i*, the second transistor M2 may be turned on. If the second transistor M2 is turned on, a data signal DS may be supplied from the data line Dm to the first node N1. Here, since the second node N2 has been initialized to the voltage of the first initialization power Vint1 that is lower than the data signal DS (e.g., the second node N2 has been initialized to an on-bias state), the first transistor M1 may be turned on.

When the first transistor M1 is turned on, the data signal DS supplied to the first node N1 may be supplied to the second node N2 via the first transistor M1 that is connected in the form of a diode. Here, a voltage corresponding to the data signal DS and the threshold voltage of the first transistor M1 may be applied to the second node N2. Here, the storage capacitor Cst may store a voltage corresponding to the second node N2.

Thereafter, the supply of the emission control signal to the emission control line Ei may be suspended. If the supply of the emission control signal to the emission control line Ei is suspended, the fifth and the sixth transistors M5 and M6 are turned on. Furthermore, the seventh transistor M7 is turned off. Here, the first transistor M1 may control driving current flowing to the light emitting element LD in response to the voltage of the second node N2. The light emitting element LD may generate light having a luminance corresponding to the amount of current.

Although, for the sake of description, FIG. 3A illustrates that a scan signal is supplied to each of the scan lines S1 and S2, exemplary embodiments are not limited thereto. For example, a plurality of scan signals may be supplied to each of the scan lines S1 and S2. In this case, the operating process is substantially the same as that of FIG. 3A; therefore, a detailed description thereof will be omitted to avoid redundancy. In the following descriptions, it is assumed that a scan signal is supplied to each of the scan lines S1 and S2.

Figure 3B:
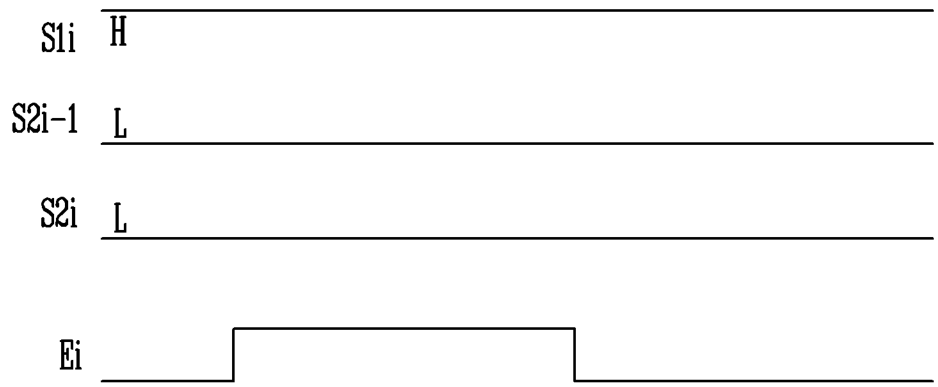
FIG. 3B is an exemplary timing diagram illustrating an example of an operation of the pixel of FIG. 2.

FIG. 3B is an exemplary timing diagram illustrating an example of an operation of the pixel PXL of FIG. 2.

Referring to FIGS. 2 and 3B, when the display device 1000 is driven at the second driving frequency, the pixel PXL may periodically increase the voltage of the first electrode (e.g., a source electrode) of the first transistor M1 during the second period so as to maintain the luminance of an image that is output during the first period.

In an embodiment, during the second period, a scan signal is supplied to neither the third transistor M3 nor the fourth transistor M4. For example, during the second period, a scan signal to be supplied to the i−1-th second scan line S2*i*−1 and the i-th second scan line S2*i* may have a logic low level L.

Since the third and fourth transistors M3 and M4 remain turned off, the gate voltage (i.e., the second node N2) of the first transistor M1 may not be affected by the operation performed during the second period.

Furthermore, in an embodiment, a scan signal may not be supplied to the second transistor M2 during the second period. For example, during the second period, a scan signal to be supplied to the first scan lines S1 may have a logic high level H.

In other words, during the second period, only an emission control signal may be supplied to the pixel PXL through the emission control line Ei. During the second period (for example, indicated by T2 in FIG. 5), a scan signal is supplied to neither the first scan line S1 nor the second scan line S2.

While all of the second to fourth transistors M2 to M4 are turned off, the emission control signal to be supplied to the i-th emission control line Ei makes a transition from a logic low level to a logic high level. Thereby, the fifth transistor M5 and the sixth transistor M6 are turned off. Here, as the gate voltage of the fifth transistor M5 is increased, e.g., by a parasitic capacitor between the gate electrode of the fifth transistor M5 and the first node N1, the voltage of the first node N1 is coupled with the increased gate voltage of the fifth transistor M5, whereby the voltage of the first node N1 may be increased. Therefore, each time an emission control signal is supplied to the emission control line Ei during the second period, an on-bias may be applied to the first transistor M1.

Thus, in the low-frequency driving mode, there is no need to turn on the second transistor M2 for application of an on-bias during the second period, and the first scan driver 200 may not output a scan signal during the second period. Consequently, the power consumption may be reduced.

Figure 4:
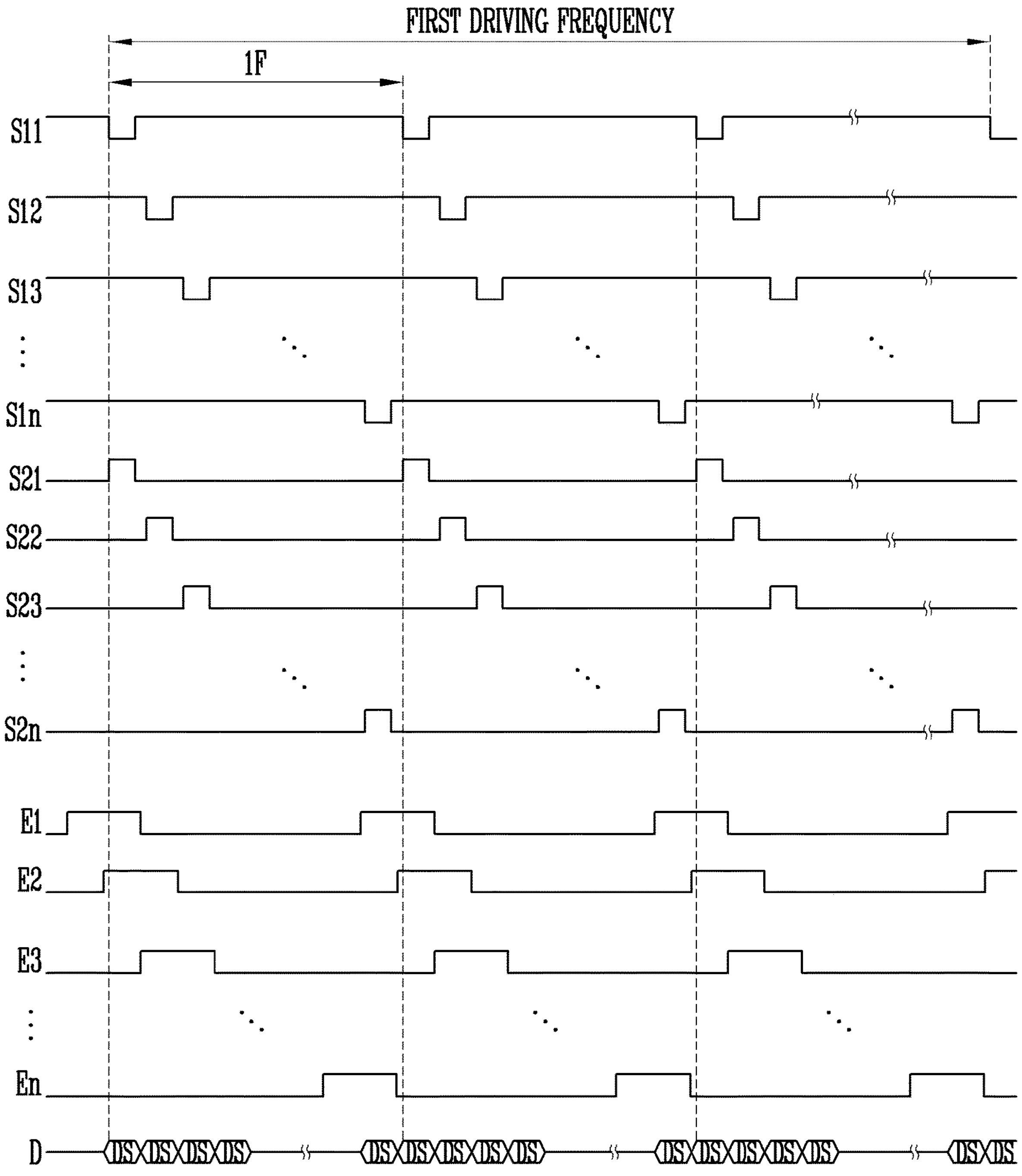
FIG. 4 is an exemplary timing diagram illustrating an example of a method of driving the display device of FIG. 1 when the display device is driven at a first driving frequency.

FIG. 4 is an exemplary timing diagram illustrating an example of a method of driving the display device 1000 of FIG. 1 when the display device 1000 is driven at the first driving frequency.

For example, the first driving frequency may be set to a value ranging from about 60 Hz to about 120 Hz. The first driving frequency is a driving frequency which is used when the display device 1000 displays a normal image.

Referring to FIG. 4, when the display device is driven at the first driving frequency, scan signals are sequentially supplied to the first scan lines S11 to S1*n* and the second scan lines S21 to S2*n* during each frame period 1F. Here, a representative scan signal to be supplied to an i-th first scan line S1*i* may overlap with a representative scan signal to be supplied to an i-th second scan line S2*i*.

When the display device 1000 is driven at the first driving frequency, emission control signals are sequentially supplied to the emission control lines E1 to En during each frame period 1F. Here, a representative emission control signal to be supplied to an i-th emission control line Ei may overlap with scan signals to be supplied to the i−1-th first scan line S1*i*−1 and the i-th first scan line S1*i*. Data signals DS are supplied to the data lines D in synchronization with the scan signals.

The pixels PXL may emit light in response to the data signals DS, and an image may be displayed on the pixel unit 100.

Figure 5:
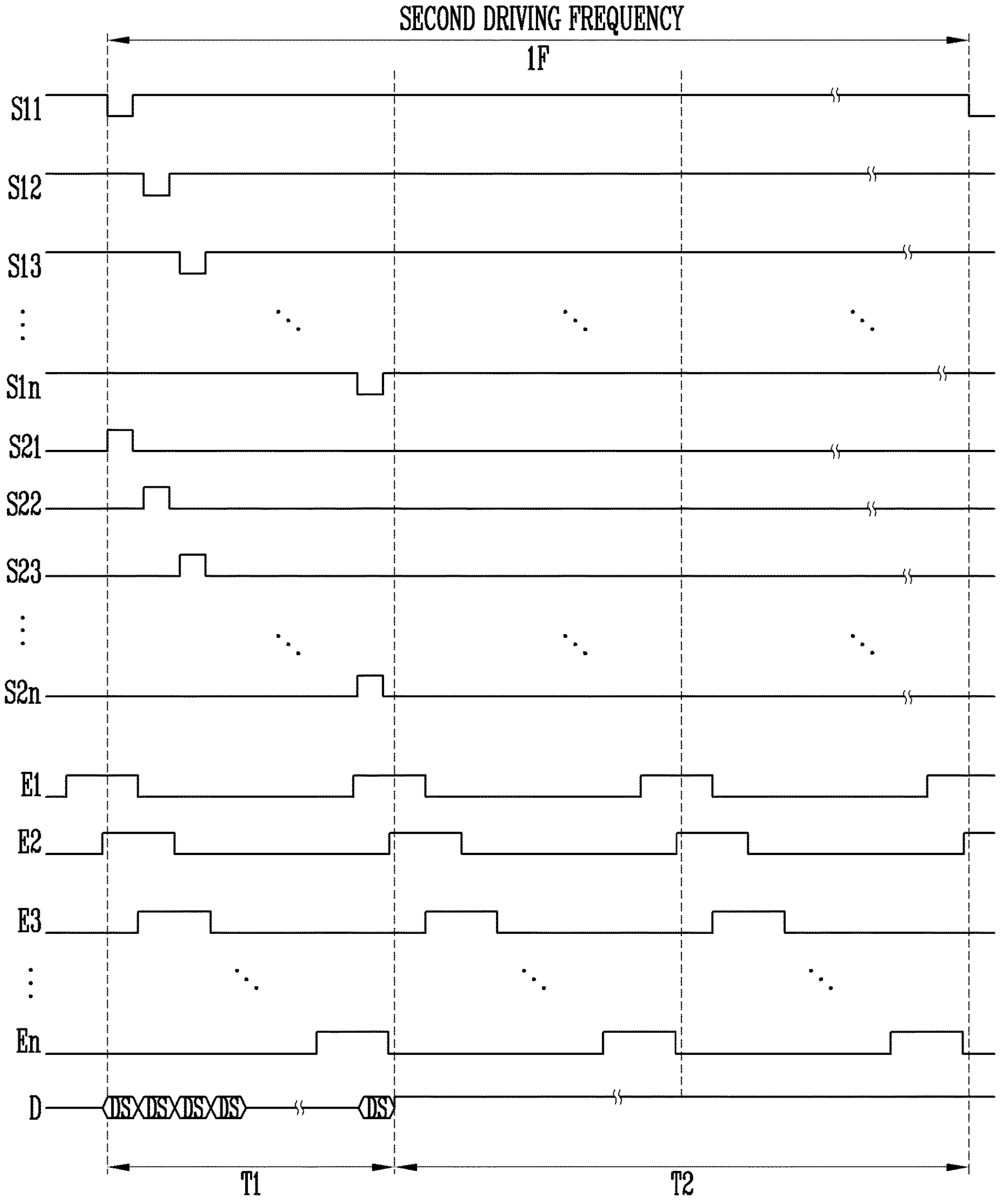
FIG. 5 is an exemplary timing diagram illustrating an example of a method of driving the display device of FIG. 1 when the display device is driven at a second driving frequency.

FIG. 5 is an exemplary timing diagram illustrating an example of a method of driving the display device 1000 of FIG. 1 when the display device 1000 is driven at the second driving frequency.

For example, the second driving frequency may be set to a frequency less than about 60 Hz. The second driving frequency is a driving frequency which is used to display an image when the display device 1000 is in a standby mode or the like.

Referring to FIG. 5, when the display deice 1000 is driven at the second driving frequency, each frame period 1F is divided into a first period T1 and a second period T2. Here, the second period T2 may be set to a period longer than the first period T1.

Scan signals to be supplied to the i-th scan lines S1*i* and S2*i* and data signals DS corresponding to the scan signals may be supplied at substantially the same cycle as the second driving frequency.

During the first period T1, scan signals are sequentially supplied to the first scan lines S11 to S1*n* and the second scan lines S21 to S2*n*. Here, a scan signal to be supplied to an i-th first scan line S1*i* may overlap with a scan signal to be supplied to an i-th second scan line S2*i*.

Furthermore, during the first period T1, emission control signals are sequentially supplied to the emission control lines E1 to En. Here, an emission control signal to be supplied to an i-th emission control line Ei may overlap with scan signals to be supplied to an i−1-th first scan line S1*i*−1 and the i-th first scan line S1*i*.

Data signals DS are supplied to the data lines D in synchronization with the scan signals. A data signal DS to be supplied to an i-th horizontal line may be supplied at substantially the same cycle as the second driving frequency.

During the second period T2, scan signals are not supplied to the first scan lines S11 to S1*n* and the second scan lines S21 to S2*n*.

Furthermore, during the second period T2, a plurality of emission control signals are supplied to each of the emission control lines E1 to En. For example, in the case where the second driving frequency is about 1 Hz, an emission control signal is supplied to the i-th emission control line Ei once during the first period T1, and an emission control signal is supplied to the i-th emission control line Ei fifty-nine times during the second period T2.

During the second period T2, the voltage of a reference power supply Vref may be supplied to each of the data lines D. However, this is only for illustrative purposes, and no voltage may be applied to the data lines D during the second period T2.

In the low-frequency driving mode using the second driving frequency (e.g., about 1 Hz), after a data signal DS is applied to each data line D once, an image corresponding to the data signal DS may be displayed for a long time. Therefore, a flicker phenomenon may occur due to hysteresis of the first transistor M1.

However, as described with reference to FIG. 3B, in the display device 1000 using the pixels PXL in accordance with exemplary embodiments of the invention, each time an emission control signal is supplied during the second period T2, the voltage of the first electrode of the first transistor M1 is increased. Thereby, the hysteresis characteristics of the first transistor M1 may be improved.

In addition, since during the second period T2 scan signals are supplied to neither the first scan lines S11 to S1*n* nor the second scan lines S21 to S2*n* (i.e., the number of toggles of scan signals at the second driving frequency is reduced), the power consumption in the low-frequency driving mode may be reduced. Here, toggling may mean that the voltage level of a scan signal changes from the gate on level to the gate off level, and/or from the gate off level to the gate on level.

Figure 6:
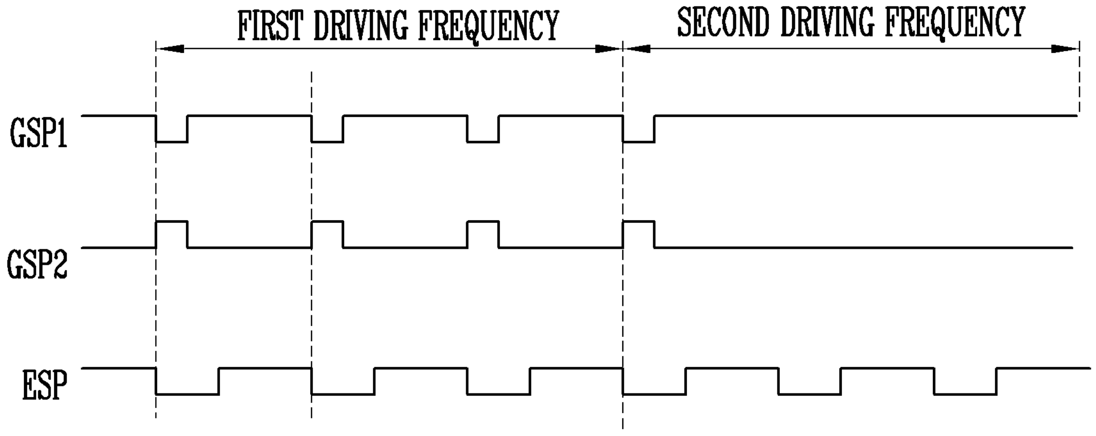
FIG. 6 is an exemplary timing diagram illustrating examples of gate start pulses to be supplied to scan drivers included in the display device of FIG. 1.

FIG. 6 is an exemplary timing diagram illustrating examples of gate start pulses to be supplied to scan drivers included in the display device 1000 of FIG. 1.

Referring to FIGS. 1, 4, 5, and 6, the output frequencies of the first and second gate start pulses GSP1 and GSP2 may vary depending on the driving frequency.

In an embodiment, the pulse widths of the first and second gate pulses GSP1 and GSP2 may be substantially the same as each other. The pulse width of the emission start pulse ESP may be greater than the pulse width of the first and second gate pulses GSP1 and GSP2.

In an embodiment, the timing controller 600 may output the emission start pulse ESP at a constant frequency, regardless of the driving frequency. For example, the output frequency of the emission start pulse ESP may be set to be substantially the same as the maximum driving frequency of the display device 1000.

In the case where the display device 1000 is driven at the first driving frequency, the same number of scan signals is supplied to the first scan lines S11 to S1*n* and the second scan lines S21 to S2*n*. For example, the display device 1000 is driven at the first driving frequency, the timing controller 600 supplies the first gate start pulse GSP1 to the first scan driver 200 at the first driving frequency. Furthermore, when the display device 1000 is driven at the first driving frequency, the timing controller 600 supplies the second gate start pulse GSP2 to the second scan driver 300 at the first driving frequency. In addition, when the display device 1000 is driven at the first driving frequency, the timing controller 600 supplies the emission start pulse ESP to the emission driver 400 at the first driving frequency.

In the case where the display device 1000 is driven at the second driving frequency (e.g., in a low-frequency driving mode), the timing controller 600 supplies the first gate start pulse GSP1 to the first scan driver 200 at the second driving frequency. Furthermore, when the display device 1000 is driven at the second driving frequency, the timing controller 600 supplies the second gate start pulse GSP2 to the second scan driver 300 at the second driving frequency. Therefore, when the display device 1000 is driven at the second driving frequency, the first and second scan drivers 200 and 300 may output scan signals only during the first period (indicated by T1 in FIG. 5).

Although the display device 1000 is driven at the second driving frequency, the timing controller 600 supplies the emission start pulse ESP to the emission driver 400 at the first driving frequency.

Figure 7:
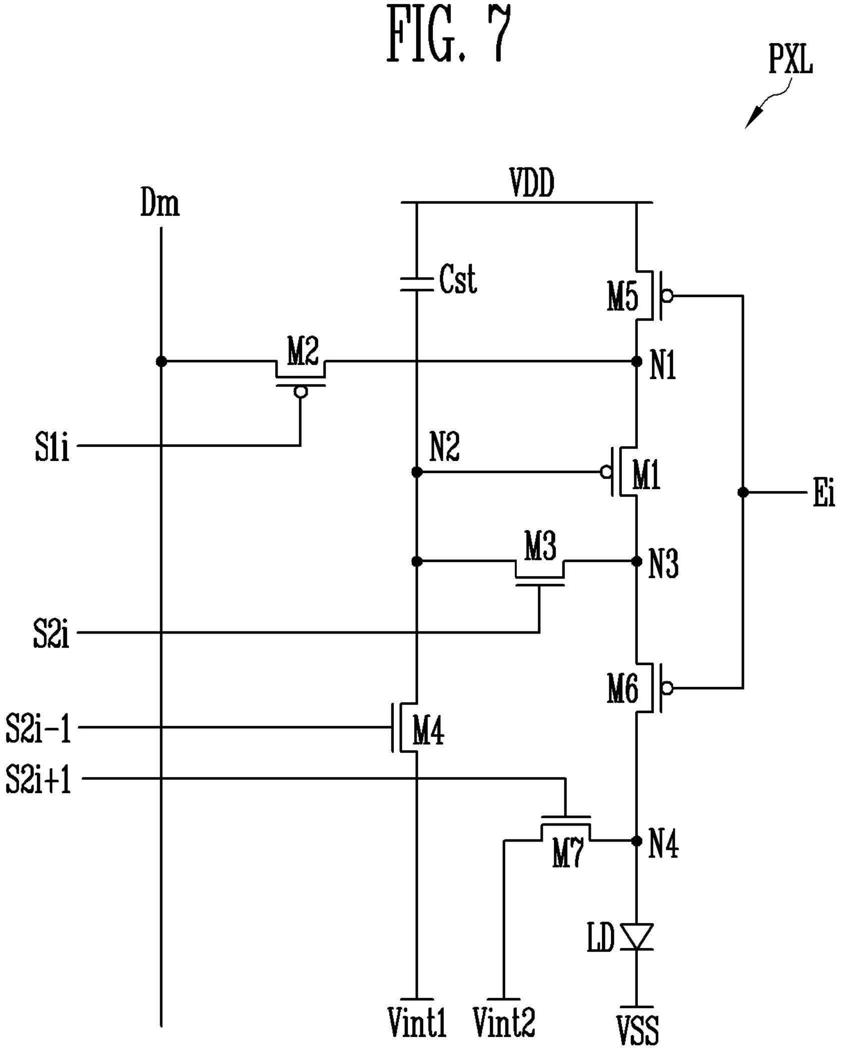
FIG. 7 is a circuit diagram illustrating an exemplary embodiment of a representative pixel included in the display device of FIG. 1.
Figure 8A:
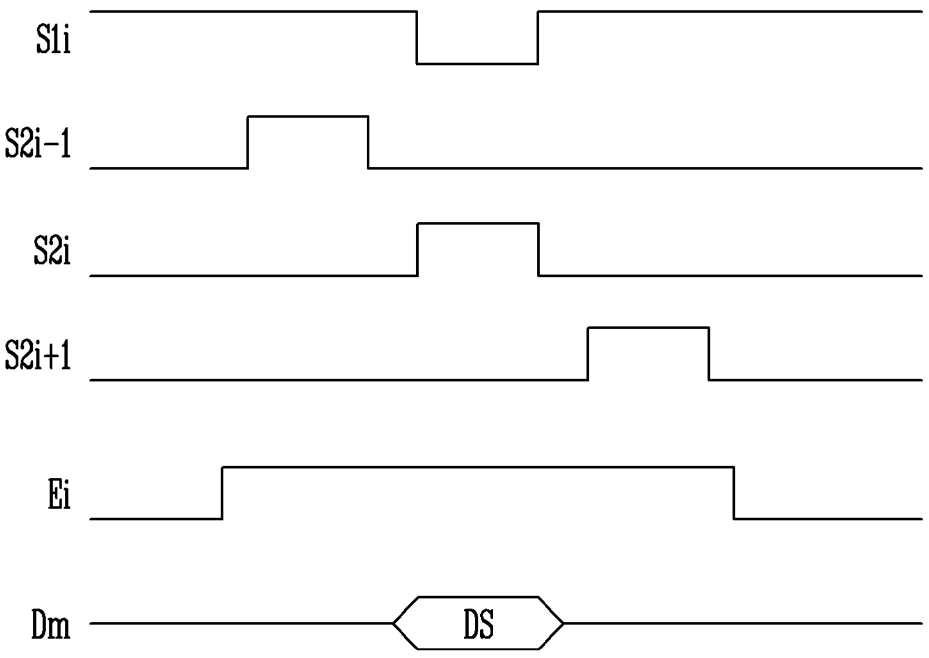
FIG. 8A is an exemplary timing diagram illustrating an example of an operation of the pixel of FIG. 7.
Figure 8B:
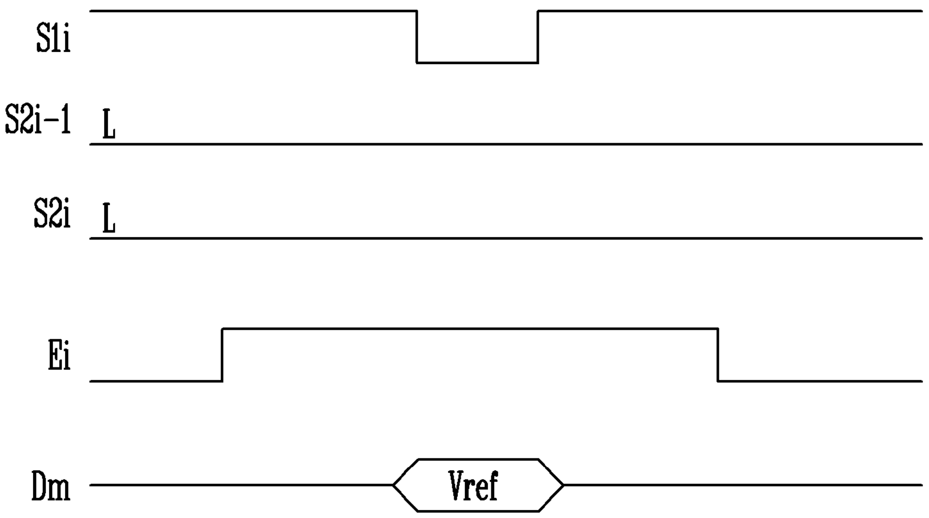
FIG. 8B is an exemplary timing diagram illustrating an example of an operation of the pixel of FIG. 7.

FIG. 7 is a circuit diagram illustrating an exemplary embodiment of a representative pixel PXL included in the display device 1000 of FIG. 1, FIG. 8A is an exemplary timing diagram illustrating an example of an operation of the pixel PXL of FIG. 7, and FIG. 8B is an exemplary timing diagram illustrating an example of an operation of the pixel PXL of FIG. 7.

In the following description of FIGS. 7 to 8B, the same reference numerals are used to designate the same or similar components as those of FIGS. 2 to 3B, and repetitive descriptions thereof will be omitted to avoid redundancy.

Referring to FIGS. 7 to 8B, the pixel PXL may include a light emitting element LD, first to seventh transistors M1 to M7, and a storage capacitor Cst.

Each of the third transistor M3, the fourth transistor M4, and the seventh transistor M7 is formed of an N-type transistor. For example, each of the third transistor M3, the fourth transistor M4, and the seventh transistor M7 may be formed of an N-type oxide semiconductor transistor.

In an embodiment, a gate electrode of the seventh transistor M7 may be coupled to an i+1-th second scan line S2*i*+1. The seventh transistor M7 is turned on after a data write operation and a threshold voltage compensation operation for the first transistor M1 have been performed.

However, this is only for illustrative purposes, and the gate electrode of the seventh transistor M7 may be coupled to the i−1-th second scan line S2*i*−1 or the i-th second scan line S2*i*. Hence, a timing of initializing the light emitting element LD may be adjusted.

FIG. 8A illustrates a method of driving a pixel PXL when the display device 1000 is driven at the first driving frequency. Also, during the first period T1 in the case where the display device 1000 is driven at the second driving frequency, the pixel PXL is operated according to the driving method of FIG. 8A.

The seventh transistor M7 is controlled by a control signal supplied to the i+1-th second scan line S2*i*+1. Therefore, the timing of supplying the voltage of the second initialization power supply Vint2 to the light emitting element LD may be separated from a data write timing and a gate initialization timing of the first transistor M1.

The method of driving the pixel PXL, other than driving timing of the seventh transistor, is substantially the same as the driving method described with reference to FIG. 3A; therefore, a repetitive description thereof will be omitted to avoid redundancy.

FIG. 8B illustrates a method of driving the pixel PXL during the second period T2. In an embodiment, during a non-emission period (i.e., a period in which an emission control signal is supplied) of the second period T2, a scan signal is supplied to the first scan line S1*i*, and the second transistor M2 is turned on. Here, a reference voltage Vref is supplied from the data line Dm to the first electrode of the first transistor M1. Hence, during the second period T2, if a scan signal is supplied to the first scan line S1*i*, an on-bias may be applied to the first transistor M1.

Figure 9:
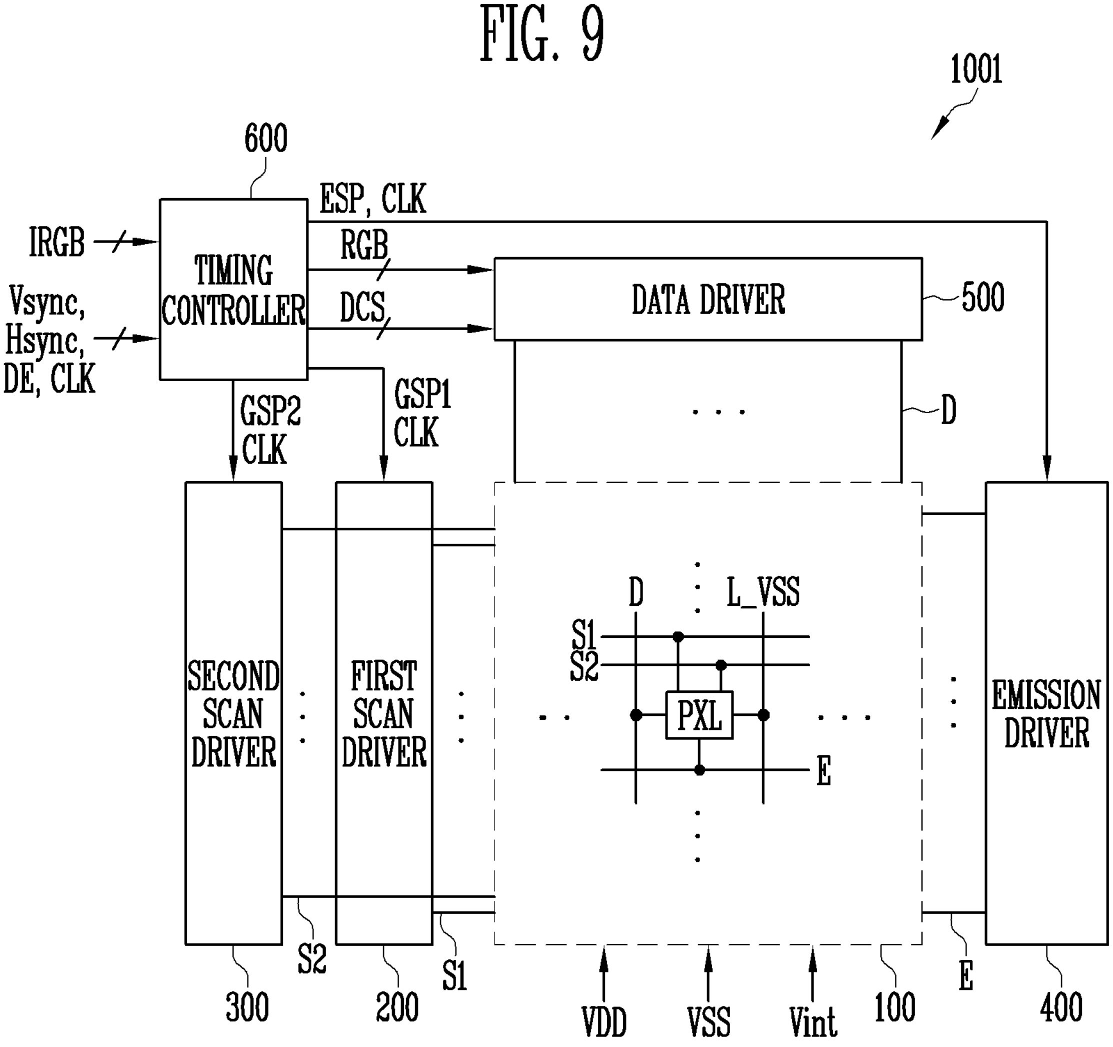
FIG. 9 is a block diagram illustrating an exemplary embodiment of another display device constructed according to principles of the invention.
Figure 10A:
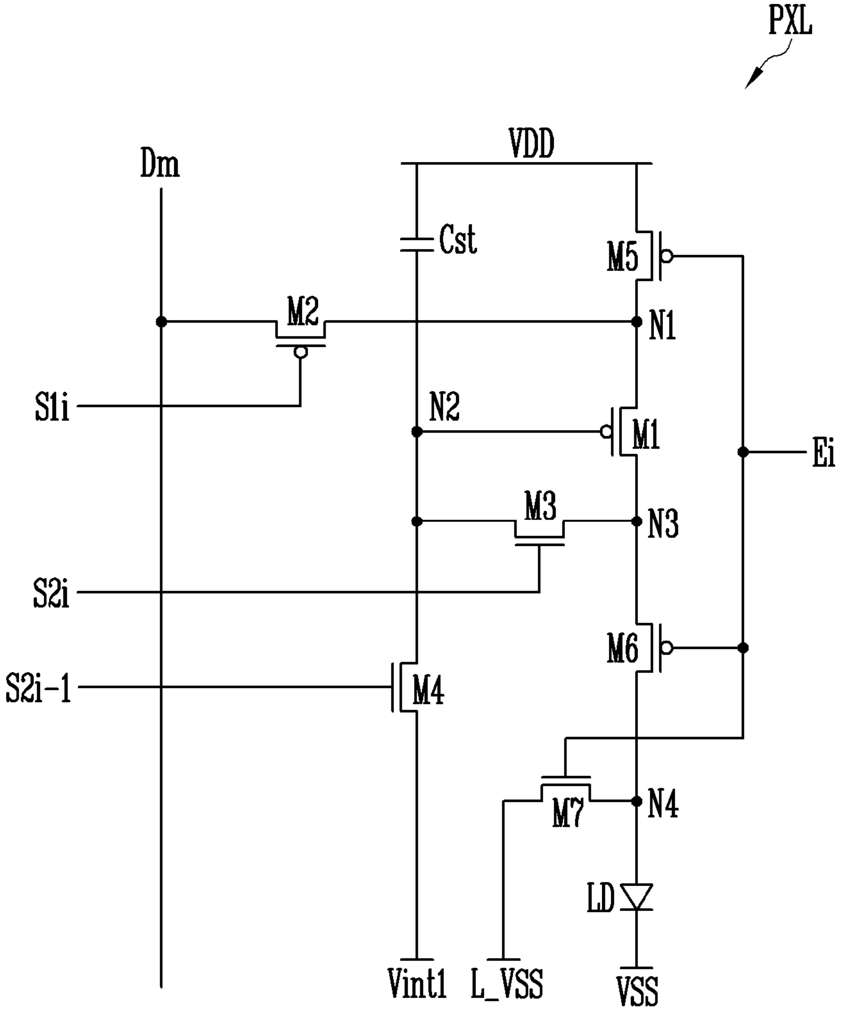
FIG. 10A is a circuit diagram illustrating an exemplary embodiment of a representative pixel included in the display device of FIG. 9.
Figure 10B:
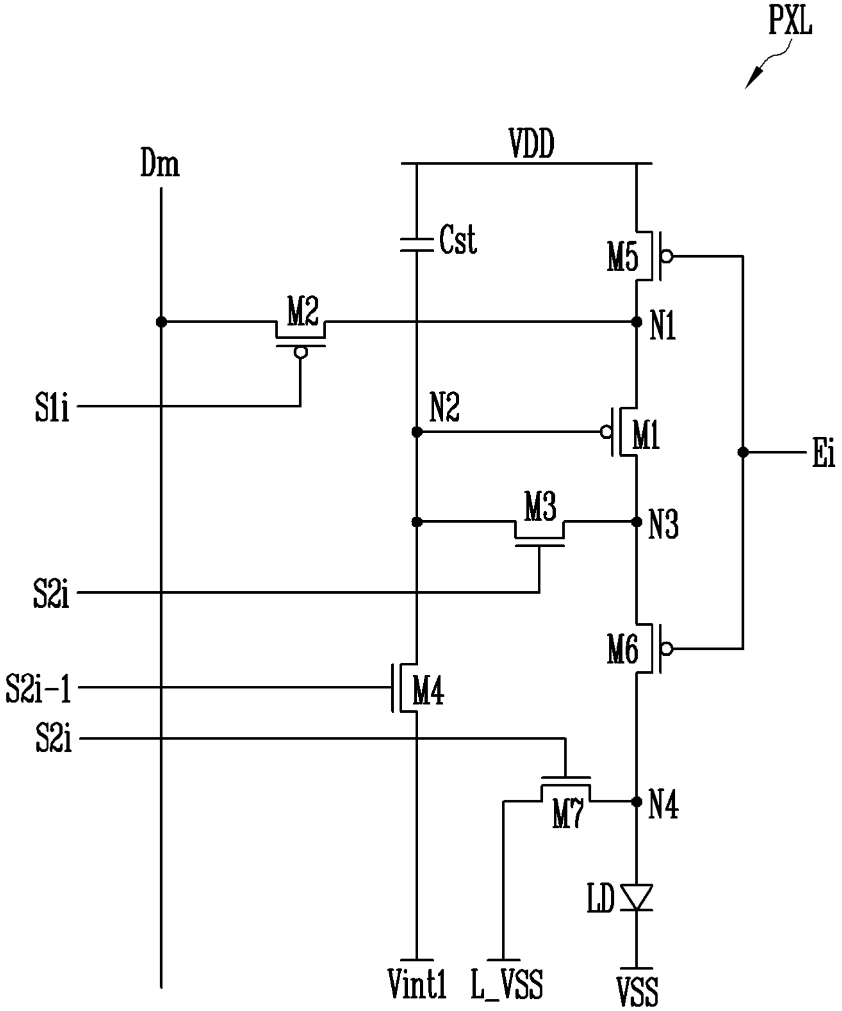
FIG. 10B is a circuit diagram illustrating an exemplary embodiment of a representative pixel included in the display device of FIG. 9.

FIG. 9 is a block diagram illustrating an exemplary embodiment of another display device 1001 constructed according to principles of the invention of FIG. 1, FIG. 10A is a circuit diagram illustrating an exemplary embodiment of a representative pixel PXL included in the display device 1001 of FIG. 9, and FIG. 10B is a circuit diagram illustrating an exemplary embodiment of a representative pixel PXL included in the display device 1001 of FIG. 9.

In the following description of FIG. 9, the same reference numerals are used to designate the same or similar components as those of FIG. 1, and repetitive descriptions thereof will be omitted to avoid redundancy. In the following description of FIGS. 10A and 10B, the same reference numerals are used to designate the same or similar components as those of FIGS. 2 and 7, and repetitive descriptions thereof will be omitted to avoid redundancy.

Referring to FIGS. 9 to 10B, the display device 1001 may include a pixel unit 100, a first scan driver 200, a second scan driver 300, an emission driver 400, a data driver 500, and a timing controller 600.

In general, the second electrode (e.g., a cathode electrode) of the light emitting element LD is coupled to a common electrode disposed on the second electrode. The common electrode may be a conductive layer formed integrally on the light emitting elements LD of the pixel unit 100. The voltage of the second power supply VSS may be supplied to the conductive layer.

In an embodiment, a power supply line L_VSS for transmitting the second power supply VSS may be further disposed in the pixel unit 100 on which the pixels PXL are disposed. The power supply line L_VSS is disposed under the light emitting elements LD and positioned between the light emitting elements LD and a predetermined substrate. For example, the power supply line L_VSS may be disposed on the same layer as the first scan lines S1, the second scan lines S2, the data lines D, or the emission control lines E. The power supply line L_VSS may include a plurality of lines extending in one direction in the pixel unit 100, or may be disposed in a mesh pattern.

The power supply line L_VSS is electrically coupled to the common electrode. Furthermore, the voltage of the second power supply VSS may be supplied to the power supply line L_VSS.

A voltage drop due to line resistance may occur in the power supply line L_VSS. Therefore, the voltage of the power supply line L_VSS may be different from the voltage of the common electrode directly coupled to the second electrode of the light emitting element LD.

In an embodiment, the seventh transistor M7 may be coupled between a fourth node N4 and the power supply line L_VSS for transmitting the voltage of the second power supply VSS. For example, as illustrated in FIGS. 10A and 10B, the second initialization power supply coupled to the seventh transistor M7 may be replaced with the power supply line L_VSS. If the seventh transistor M7 is turned on, the voltage of the power supply line L_VSS is supplied to the fourth node N4, and the residual voltage charged into the parasitic capacitor may be discharged (removed).

As such, structure for forming a separate second initialization power supply and a line for transmitting the voltage of the second initialization power supply may be omitted, so that the production cost may be reduced.

Figure 11:
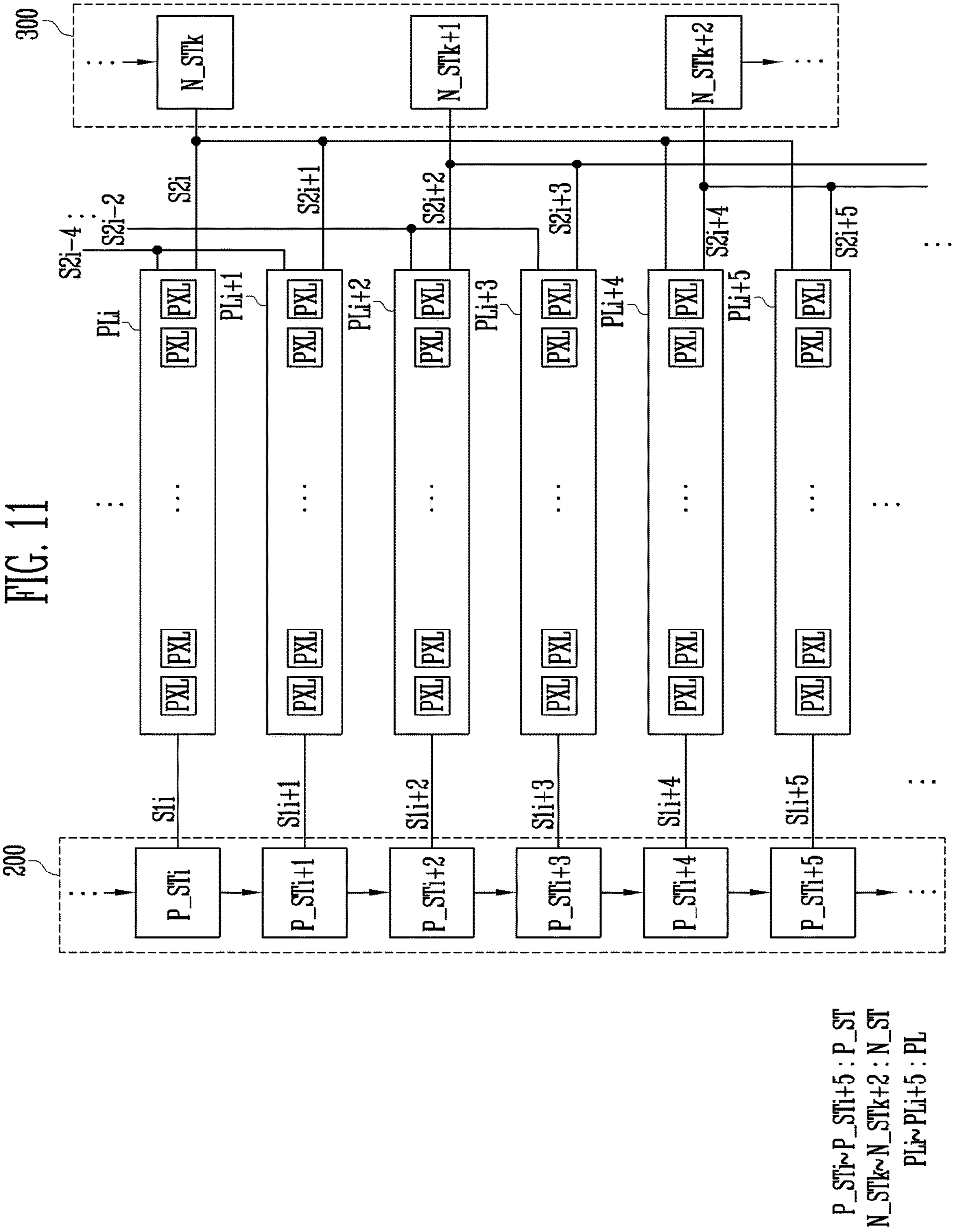
FIG. 11 is a block diagram illustrating exemplary embodiments of scan drivers included in the display device of FIG. 1.

FIG. 11 is a block diagram illustrating exemplary embodiments of scan drivers included in the display device 1000 of FIG. 1.

Referring to FIGS. 1, 2, and 11, the first scan driver 200 is coupled to the first scan lines S1, and the second scan driver 300 is coupled to the second scan lines S2.

The pixel unit 100 includes a plurality of pixel lines PL. For example, the pixel unit 100 may include n pixel lines PL (with n being a natural number greater than 1). Each of the pixel lines PL includes pixels PXL coupled to an identical scan line. Furthermore, each of the pixel lines PL is coupled to at least one of the first scan lines S1 and at least one of the second scan line S2.

The first scan driver 200 may output first scan signals to the first scan lines S1. Each first scan signal may have a gate-on voltage having a logic low level. The first scan driver 200 includes n first stages P_ST configured to shift and output the first scan signals. An i-th first stage P_STi is coupled to an i-th first scan line S1*i*. The i-th first scan line S1*i* is coupled to an i-th pixel line PLi.

Likewise, an i+1-th first stage P_STi+1 is coupled to an i+1-th first scan line S1*i*+1. Each of the first scan signals to be supplied to the first scan lines S1 has a pulse width corresponding to a horizontal period (1H). Hence, the number of first stages P_ST included in the first scan driver 200 may correspond to the number of pixel lines PL. For example, the first scan driver 200 may include n first stages P_ST which are dependently coupled to each other.

However, this is only for illustrative purposes. For example, in the case where the first scan driver 200 outputs scan signals for controlling N-type transistors, the first scan driver 200 may include second stages.

The second scan driver 300 may output second scan signals to the second scan lines S2. Each second scan signal may have a gate-on voltage having a logic high level. The second scan driver 300 includes j second stages N_ST (here, j is a natural number less than n) configured to shift and output the second scan signals.

In an embodiment, each of the second stages N_ST may be coupled to a plurality of second scan lines S2. For example, as illustrated in FIG. 11, each of the second stages N_ST may be coupled to two consecutive second scan lines S2. A k-th second stage N_STk may be coupled to an i-th second scan line S2*i* and an i+1-th second scan line S2*i*+1.

In this case, the number of second stages N_ST may be half of the number of first stages P_ST, i.e., n/2. For example, n/2 second stages N_ST may be dependently coupled to each other.

Each of the second scan signals to be supplied to the second scan lines S2 has a pulse width corresponding to three or more horizontal periods (3H).

In the case of the pixel PXL of FIG. 2, a period in which the second transistor M2 and the third transistor M3 are simultaneously turned on is needed. Therefore, if first scan signals to be supplied to four first scan lines S1 overlap with a second scan signal, four second scan lines S2 may be coupled to the k-th second stage N_STK. Hence, four pixel lines may use the output of the k-th second stage N_STk in common.

In an embodiment, second scan signals are supplied to the third transistor M3 and the fourth transistor M4. To normally drive the pixel PXL, a second scan signal is first supplied to the third transistor M3, and then a second scan signal is supplied to the fourth transistor M4. The second scan signal to be supplied to the third transistor M3 does not overlap with the second scan signal to be supplied to the fourth transistor M4.

In an embodiment, an i-p-th (p is a natural number) second scan line S2*i-p* (e.g., an i–4-th second scan line S2*i*–4) may be coupled to the i-th pixel line PLi. Therefore, the i-p-th second scan line S2*i-p* may be coupled in common to an i-p-th pixel line PLi-p and the i-th pixel line PLi.

As such, the second scan driver 300 that outputs a second scan signal having a pulse width corresponding to three or more horizontal periods (3H) may output the second scan signal, in common, to third transistors M3 respectively included in the pixels of a plurality of pixel lines. Therefore, the number of second stages N_ST included in the second scan driver 300 may be reduced, and the power consumption of the second scan driver 300 and the display device 1000 including the second scan driver 300 may be reduced.

Figure 12:
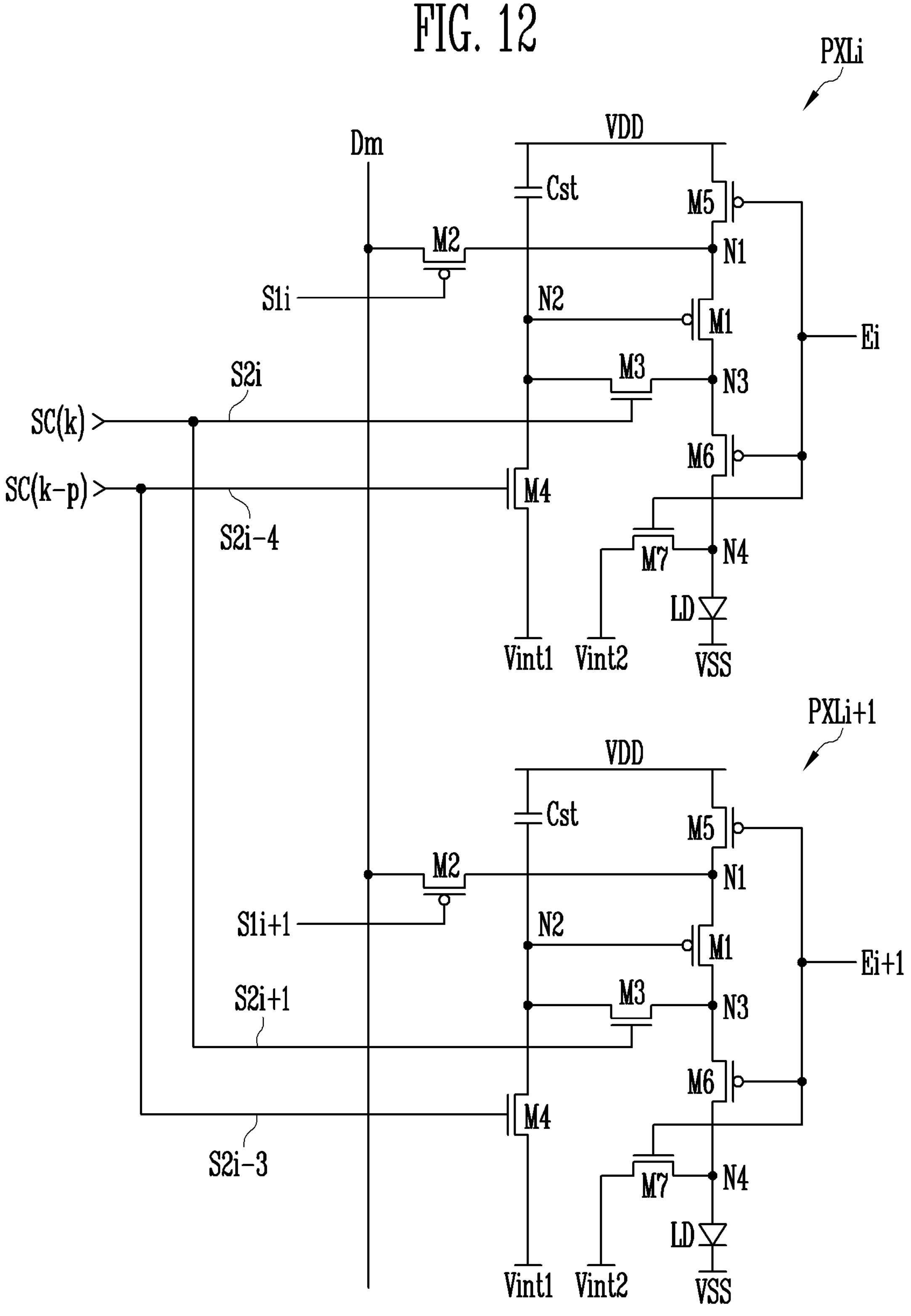
FIG. 12 is a circuit diagram illustrating exemplary embodiments of pixels coupled to the scan drivers of FIG. 11.

FIG. 12 is a circuit diagram illustrating exemplary embodiments of pixels PXL coupled to the scan drivers of FIG. 11.

In the following description of FIG. 12, the same reference numerals are used to designate the same or similar components as those of FIG. 2, and repetitive descriptions thereof will be omitted to avoid redundancy.

Referring to FIGS. 2, 11, and 12, a k-th second stage N_STk may be shared by the i-th second scan line S2*i* and the i+1-th second scan line S2*i*+1.

Although FIG. 12 illustrates that one second stage is coupled in common to two consecutive second scan lines, exemplary embodiments are not limited thereto. For example, one second stage may be coupled in common to three or more second scan lines.

An i-th pixel PXLi is disposed on the i-th pixel line PLi, and an i+1-th pixel PXLi+1 is disposed on the i+1-th pixel line PLi+1. The i-th pixel PXLi and the i+1-th pixel PXLi+1 have substantially the same configuration.

The k-th second stage N_STk may supply a k-th second scan signal SC(k) simultaneously to the i-th second scan line S2*i* and the i+1-th second scan line S2*i*+1. Hence, a k-p-th second scan signal SC(k-p) is supplied both to the third transistor M3 of the i-th pixel PXLi and to the third transistor M3 of the i+1-th pixel PXLi.

Hereinafter, the k-th second scan signal SC(k) may be interpreted as being a scan signal output from the k-th second stage N_STk.

Likewise, a k-p-th second stage N_STk-p may supply a k-p-th second scan signal SC(k-p) simultaneously to an i−4-th second scan line S2*i*−4 and an i−3-th second scan line S2*i*−3. A gate electrode of the fourth transistor M4 of the i-th pixel PXLi is coupled to the i−4-th second scan line S2*i*−4. A gate electrode of the fourth transistor M4 of the i+1-th pixel PXLi+1 is coupled to the i−3-th second scan line S2*i*−3. Hence, a k-p-th second scan signal SC(k-p) is supplied both to the fourth transistor M4 of the i-th pixel PXLi and to the fourth transistor M4 of the i+1-th pixel PXLi.

Figure 13A:
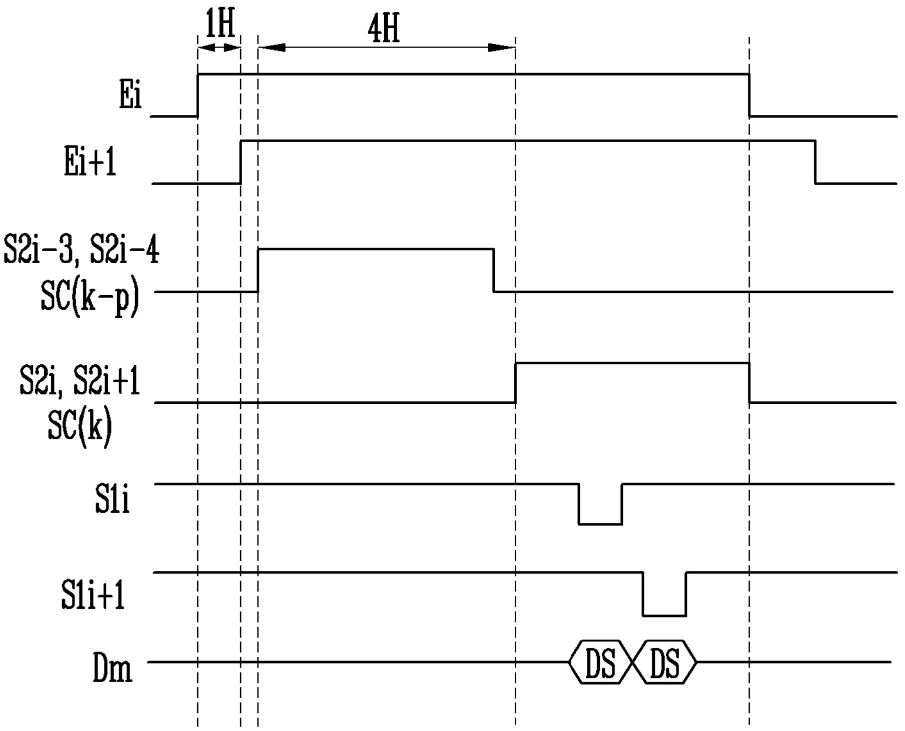
FIG. 13A is an exemplary timing diagram illustrating an example of an operation of the pixels of FIG. 12.

FIG. 13A is an exemplary timing diagram illustrating an example of an operation of the pixels PXL of FIG. 12.

Referring to FIGS. 12 and 13A, in the case where the display device 1000 is driven at the first driving frequency, a k-th second scan signal SC(k) is supplied in common to the i-th pixel PXLi and the i+1-th pixel PXLi+1.

In an embodiment, the second scan signal may have a pulse width corresponding to four horizontal periods (4H). In this case, the second scan signal overlaps with two consecutive first scan signals. Therefore, two consecutive second scan lines are coupled in common to one second stage.

The third transistor M3 of the i-th pixel PXLi and the third transistor M3 of the i+1-th pixel PXLi+1 are simultaneously controlled by the k-th second scan signal SC(k). In addition, the fourth transistor M4 of the i-th pixel PXLi and the fourth transistor M4 of the i+1-th pixel PXLi+1 are simultaneously controlled by the k-p-th second scan signal SC(k-p).

First, emission control signals are sequentially supplied to the i-th emission control line Ei and the i+1-th emission control line Ei+1. The emission control signals are supplied to the i-th emission control line Ei and the i+1-th emission control line Ei+1 at an interval of one horizontal period (1H).

Thereafter, a second scan signal (e.g., a k-p-th second scan signal SC(k-p)) is simultaneously supplied to the i−4-th second scan line S2*i*−4 and the i−3-th second scan line S2*i*−3. Hence, the fourth transistor M4 of the i-th pixel PXLi and the fourth transistor M4 of the i+1-th pixel PXLi+1 are simultaneously turned on, and the voltage of the first initialization power supply Vint1 is simultaneously supplied to the second nodes N2.

Subsequently, a second scan signal (e.g., a k-th second scan signal SC(k)) is simultaneously supplied to the i-th second scan line S2*i* and the i+1-th second scan line S2*i*+1. Thereby, the third transistor M3 of the i-th pixel PXLi and the third transistor M3 of the i+1-th pixel PXLi+1 are simultaneously turned on.

While the third transistor M3 of the i-th pixel PXLi and the third transistor M3 of the i+1-th pixel PXLi+1 are turned on, first scan signals are sequentially supplied to the i-th pixel PXLi and the i+1-th pixel PXLi+1. Hence, data signals DS are sequentially written to the i-th pixel PXLi and the i+1-th pixel PXLi+1.

Since the third transistors M3 remain turned on even after the supply of the first scan signals has been completed, a time required for threshold voltage compensation may be reliably secured.

Thereafter, the supply of the emission control signals to the i-th emission control line Ei and the i+1-th emission control line Ei+1 is sequentially suspended, and the i-th pixel PXLi and the i+1-th pixel PXLi+1 sequentially emit light.

As such, since the third transistors M3 included in a plurality of pixel lines share a second scan signal, the power consumption of the second scan driver 300 and the display device 1000 including the second scan driver 300 may be reduced.

Figure 13B:
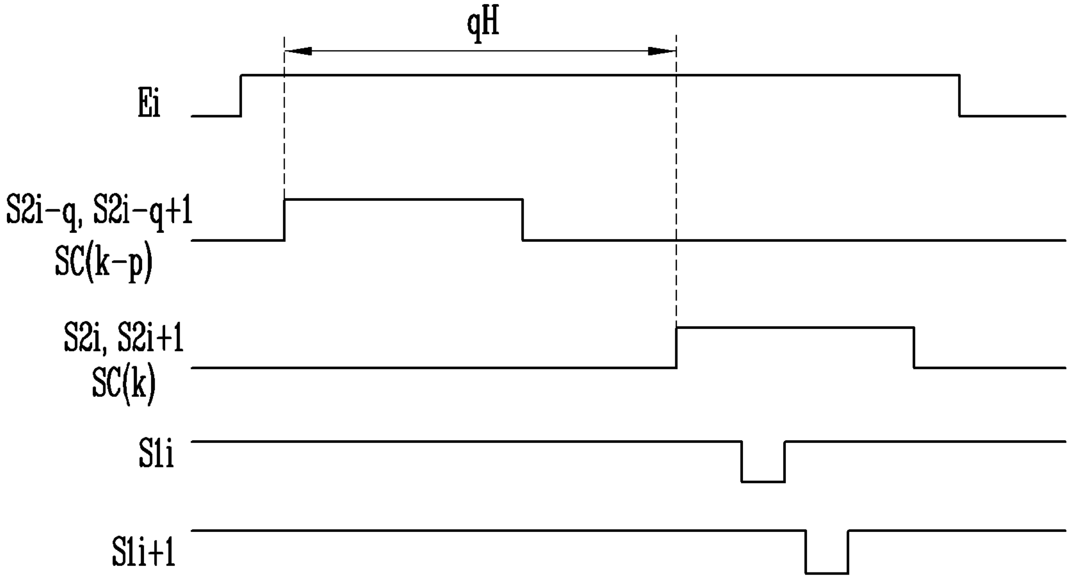
FIG. 13B is an exemplary timing diagram illustrating an example of an operation of the pixels of FIG. 12.

FIG. 13B is an exemplary timing diagram illustrating an example of an operation of the pixels PXL of FIG. 12.

In the following description of FIG. 13B, the same reference numerals are used to designate the same or similar components as those of FIG. 13A, and repetitive descriptions thereof will be omitted to avoid redundancy.

Referring to FIG. 13B, the output of a k-th second scan signal SC(k) may be delayed by q horizontal periods (qH, with q being a natural number greater than 1) compared to that of a k-p-th second scan signal SC(k-p).

Here, the k-th second scan signal SC(k) does not overlap with the k-p-th second scan signal SC(k-p). Furthermore, in the case where a supply interval between the k-th second scan signal SC(k) and the k-p-th second scan signal SC(k-p) corresponds to q horizontal periods (qH), the fourth transistor M4 of the i-th pixel PXLi is coupled to an i-q-th second scan line S2*i-q*.

However, in the case where i is less than q, a second scan signal or a gate start pulse that is output from a separate stage may be supplied to the fourth transistor M4 of the i-th pixel PXLi. For example, in the case where q is 6, a second scan signal that preceded by six horizontal periods a second scan signal supplied to the third transistors M3 of first to sixth pixels PXL1 to PXL6 may be generated from a separate stage or the like and supplied to the first to sixth pixels PXL1 to PXL6.

Figure 14A:
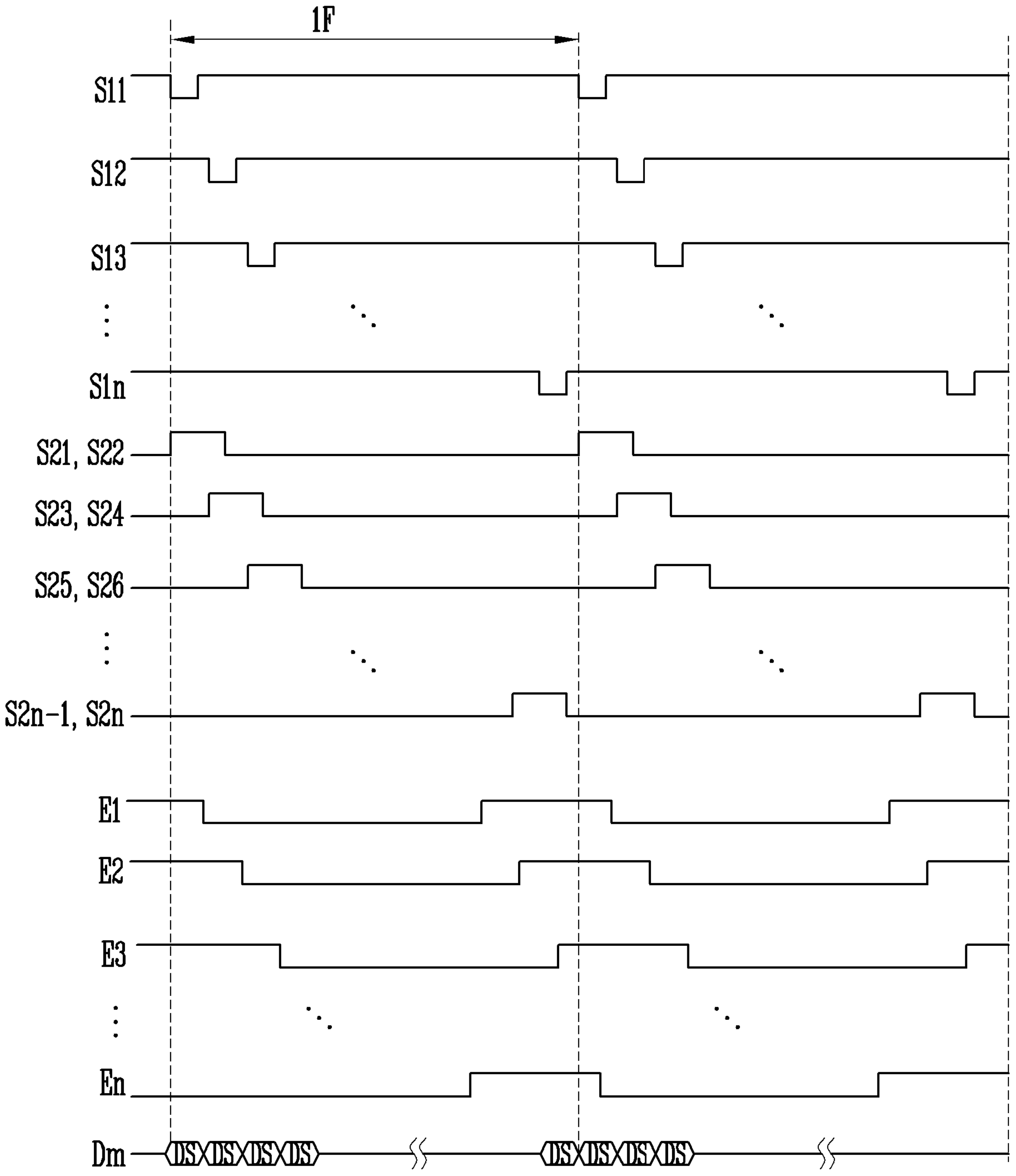
FIG. 14A is an exemplary timing diagram illustrating an example of a method of driving the display device including the pixels of FIG. 12 when the display device is driven at a first driving frequency.

FIG. 14A is an exemplary timing diagram illustrating an example of a method of driving the display device 1000 including the pixels PXL of FIG. 12 when the display device 1000 is driven at a first driving frequency.

In the following description of FIG. 14A, the same reference numerals are used to designate the same or similar components as those of FIG. 4, and repetitive descriptions thereof will be omitted to avoid redundancy.

Referring to FIG. 14A, in the case where the display device 1000 is driven at the first driving frequency, the pixel PXL may be supplied with signals for displaying images at the first driving frequency.

In an embodiment, a second scan signal is supplied in common to two consecutive second scan lines S2. Hence, the number of second scan signals sequentially output from the second scan driver 300 during each frame period 1F may be half of the number of first scan signals supplied to the first scan lines S1. Thus, the number of second stages included in the second scan driver 300 may be reduced, and the power consumption of the second scan driver 300 and the display device 1000 may be reduced.

Furthermore, at least two first scan signals overlap with each second scan signal.

A second scan signal having a pulse width of three or more horizontal periods (3H) is supplied two times to each pixel during each frame period 1F. The pulse width of the emission control signal may cover a time for which the second scan signal is supplied two times. For example, in the case where the second scan signal has a pulse width corresponding to four horizontal periods (4H), the emission control signal may have a pulse width corresponding to nine or more horizontal periods (9H).

The operation of driving the pixel using the first driving frequency has described with reference to FIGS. 3A, 13A, and 13B; therefore, repetitive descriptions thereof will be omitted to avoid redundancy.

Figure 14B:
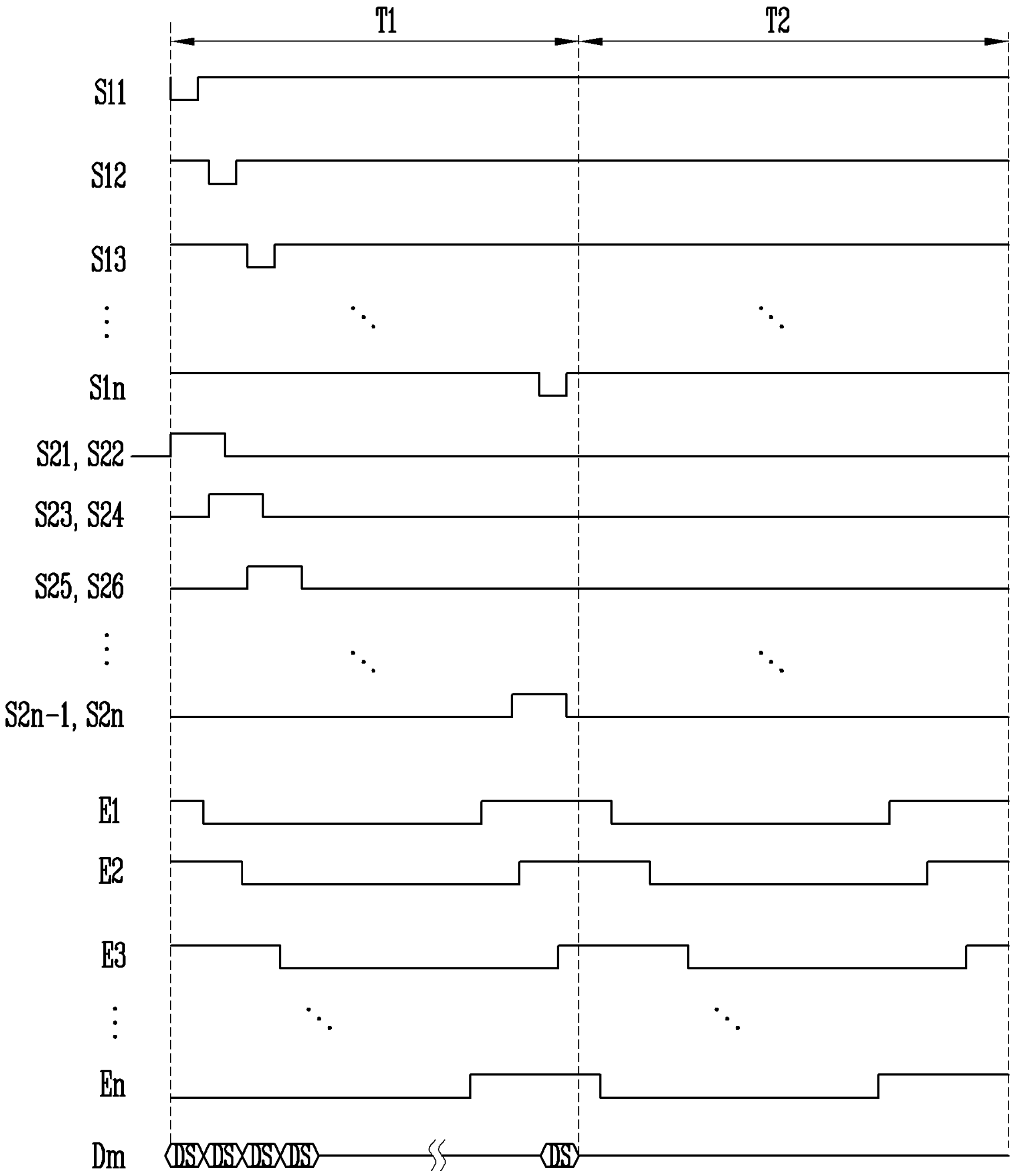
FIG. 14B is an exemplary timing diagram illustrating an example of a method of driving the display device including the pixels of FIG. 12 when the display device is driven at a second driving frequency.

FIG. 14B is an exemplary timing diagram illustrating an example of a method of driving the display device 1000 including the pixels PXL of FIG. 12 when the display device 1000 is driven at a second driving frequency.

In the following description of FIG. 14B, the same reference numerals are used to designate the same or similar components as those of FIG. 3B, and repetitive descriptions thereof will be omitted to avoid redundancy.

Referring to FIG. 14B, when the display deice 1000 is driven at the second driving frequency, each frame period 1F is divided into a first period T1 and a second period T2. Here, the second period T2 may be set to a period longer than the first period T1.

The driving operation of the display device 1000 in the first period T1 is substantially the same as that of FIG. 14A.

In an embodiment, a second scan signal is supplied in common to two consecutive second scan lines S2. Hence, the number of second scan signals sequentially output from the second scan driver 300 during each frame period 1F may be half of the number of first scan signals supplied to the first scan lines S1.

During the second period T2, the supply of the first and second scan signals may be suspended, and only the emission control signal may be periodically supplied. Due to coupling of a parasitic capacitor between the first node N1 and the gate electrode of the fifth transistor M5 by a transition of the emission control signal, an on-bias may be periodically applied to the first transistor M1. Therefore, the power consumption in the second period T2 may be reduced, so that the image quality in the low-frequency driving mode may be improved.

Figure 15:
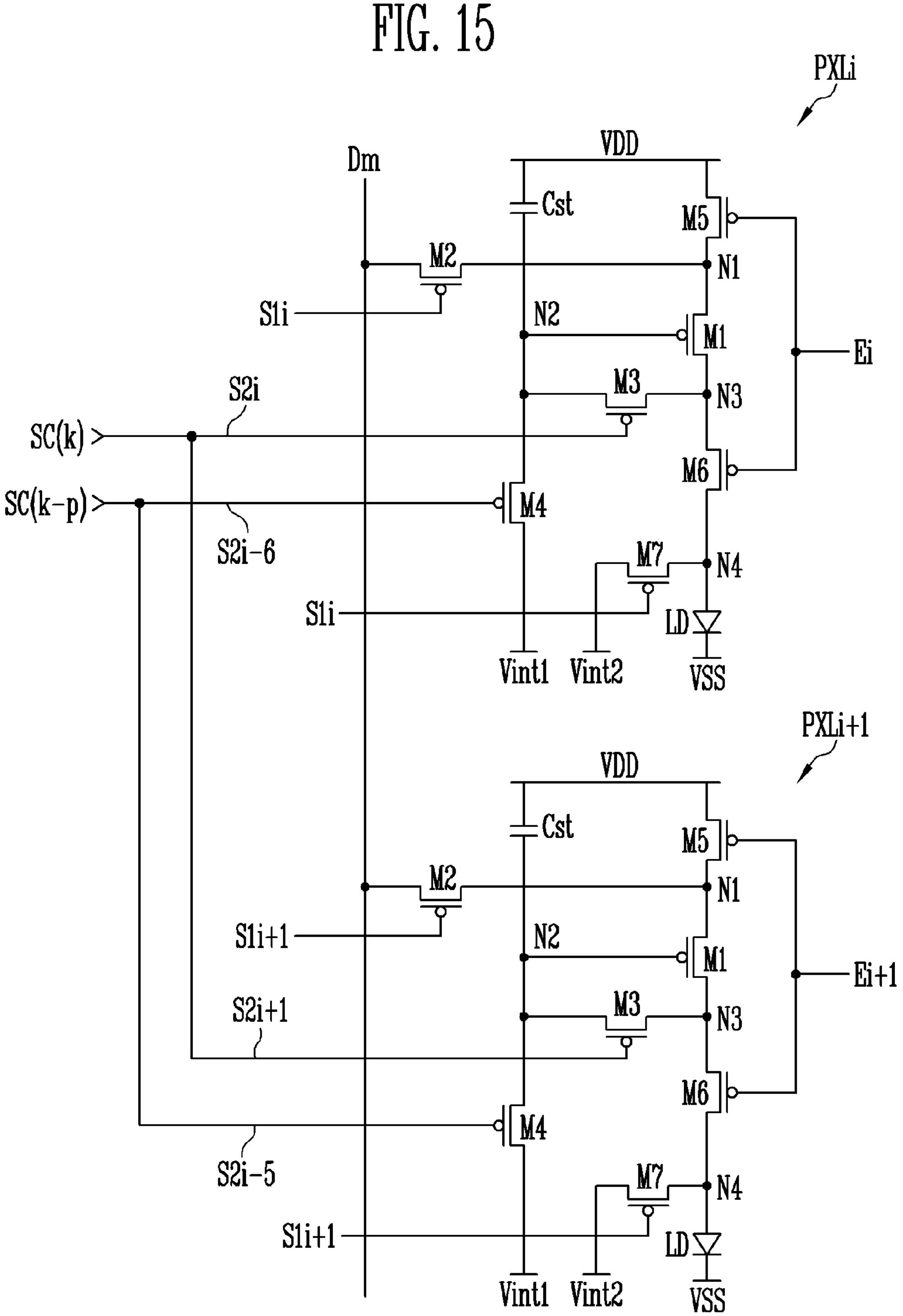
FIG. 15 is a circuit diagram illustrating exemplary embodiments of pixels coupled to the scan drivers of FIG. 11.
Figure 16:
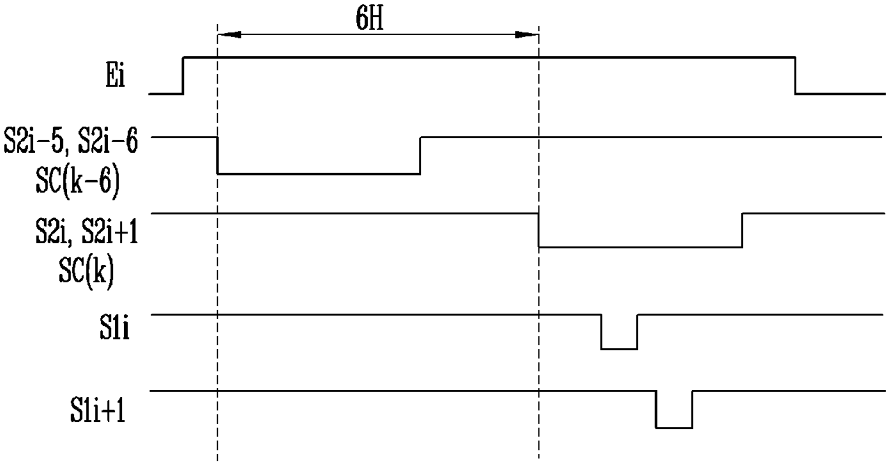
FIG. 16 is an exemplary timing diagram illustrating an example of an operation of the pixels of FIG. 15.

FIG. 15 is a circuit diagram illustrating exemplary embodiments of pixels PXL coupled to the scan drivers of FIG. 11. FIG. 16 is an exemplary timing diagram illustrating an example of an operation of the pixels PXL of FIG. 15.

A pixel in accordance with this embodiment and a method of driving pixels, other than third, fourth, and seventh transistors and scan signals for controlling the transistors, are substantially the same as the pixels of FIGS. 7 and 12 and the method of driving the pixels; therefore, the same reference numerals are used to designate the same or similar components as those of FIGS. 7 and 12, and repetitive descriptions thereof will be omitted to avoid redundancy.

Referring to FIGS. 15 and 16, each of the pixels PXLi and PXLi+1 includes a light emitting element LD, a storage capacitor Cst, and first to seventh transistors M1 to M7.

In an embodiment, each of the first to seventh transistors M1 to M7 is formed of a poly-silicon semiconductor transistor. For example, each of the first to seventh transistors M1 to M7 may be formed of a P-type LTPS transistor. Hence, each of scan signals to be supplied to the first to seventh transistors M1 to M7 has a gate-on voltage having a logical low level.

A gate electrode of the seventh transistor M7 of the i-th pixel PXLi is coupled to the i-th first scan line S1*i*. Therefore, the second transistor M2 and the seventh transistor M7 may be simultaneously controlled. However, this is only for illustrative purposes, and the gate electrode of the seventh transistor M7 of the i-th pixel PXLi may be coupled to the i−1-th first scan line S1*i*−1 or the i+1-th first scan line S1*i*+1.

In an embodiment, as illustrated in FIG. 16, the output of a k-th second scan signal SC(k) may be delayed by six horizontal periods (6H) compared to that of a k-p-th scan signal SC(k-p). Therefore, a gate electrode of the fourth transistor M4 of the i-th pixel PXLi is coupled to the i−6-th second scan line S2*i*−6. Likewise, a gate electrode of the fourth transistor M4 of the i+1-th pixel PXLi+1 is coupled to the i−5-th second scan line S2*i*−5.

A method of driving the pixels PXL of FIG. 15, other than the fact that gate-on voltages of all scan signals each have a logic low level, is substantially the same as the driving method of FIG. 13A or FIG. 13B. Therefore, repetitive descriptions thereof will be omitted to avoid redundancy.

Figure 17:
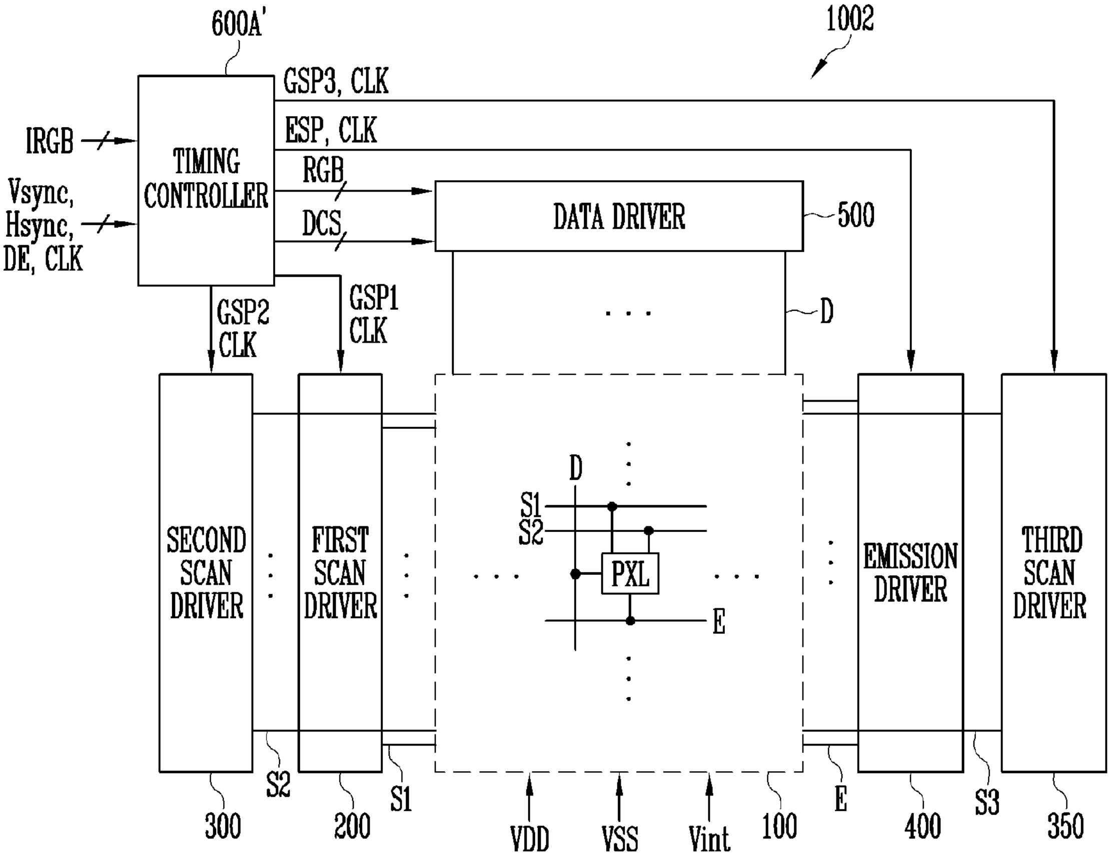
FIG. 17 is a block diagram illustrating an exemplary embodiment of another display device constructed according to principles of the invention.

FIG. 17 is a block diagram illustrating an exemplary embodiment of another display device constructed according to principles of the invention.

In the following description of FIG. 17, the same reference numerals are used to designate the same or similar components as those of FIG. 1, and repetitive descriptions thereof will be omitted to avoid redundancy.

Referring to FIG. 17, a display device 1002 may include a pixel unit 100, a first scan driver 200, a second scan driver 300, a third scan driver 350, an emission driver 400, a data driver 500, and a timing controller 600A.

The pixel unit 100 includes a plurality of pixels PXL. Each pixel PXL may have the same configuration as that of any one of the pixels described above.

The timing controller 600A may supply gate start pulses GSP1, GSP2, and GSP3 and clock signals CLK to the first scan driver 200, the second scan driver 300, and the third scan driver 350 based on timing signals Vsync, Hsync, DE, and CLK.

The first gate start pulse GSP1 may control a first timing of a scan signal to be supplied from the first scan driver 200. The second gate start pulse GSP2 may control a first timing of a scan signal to be supplied from the second scan driver 300.

The third gate start pulse GSP3 may control a first timing of a scan signal to be supplied from the third scan driver 350.

The data driver 500 may supply data signals to data lines D in response to the data driving control signal DCS. The data signals supplied to the data lines D may be supplied to pixels PXL selected by scan signals.

The first scan driver 200 may supply scan signals to the first scan lines S1 in response to the first gate start pulse GSP1. The first scan lines S1 are coupled to the gate electrodes of the second transistors M2 of the pixels PXL. For example, data signals may be written by scan signals supplied to the first scan lines S1. In an embodiment, the first scan lines S1 may also be coupled to the gate electrodes of the seventh transistors M7 of the pixels PXL.

The second scan driver 300 may supply scan signals to the third scan lines S3 in response to the third gate start pulse GSP3. The third scan lines S3 are coupled to the gate electrodes of the fourth transistors M4 of the pixels PXL.

For example, the voltage of the initialization power supply Vint may be supplied to the gate electrodes of the first transistors M1 by scan signals supplied to the third scan lines S3.

The second scan driver 300 may supply scan signals to the second scan lines S2 in response to the second gate start pulse GSP2. The second scan lines S2 are coupled to the gate electrodes of the third transistors M3 of the pixels PXL. For example, the threshold voltage of the first transistor M1 of each pixel PXL may be compensated for by a scan signal supplied to the corresponding second scan line S2.

Hence, scan signals to be supplied to the third and fourth transistors M3 and M4 may be separately controlled. Consequently, RC delay in the scan lines of FIG. 11 due to the connection relationship of the scan lines may be mitigated, and the image quality may be improved.

Figure 18:
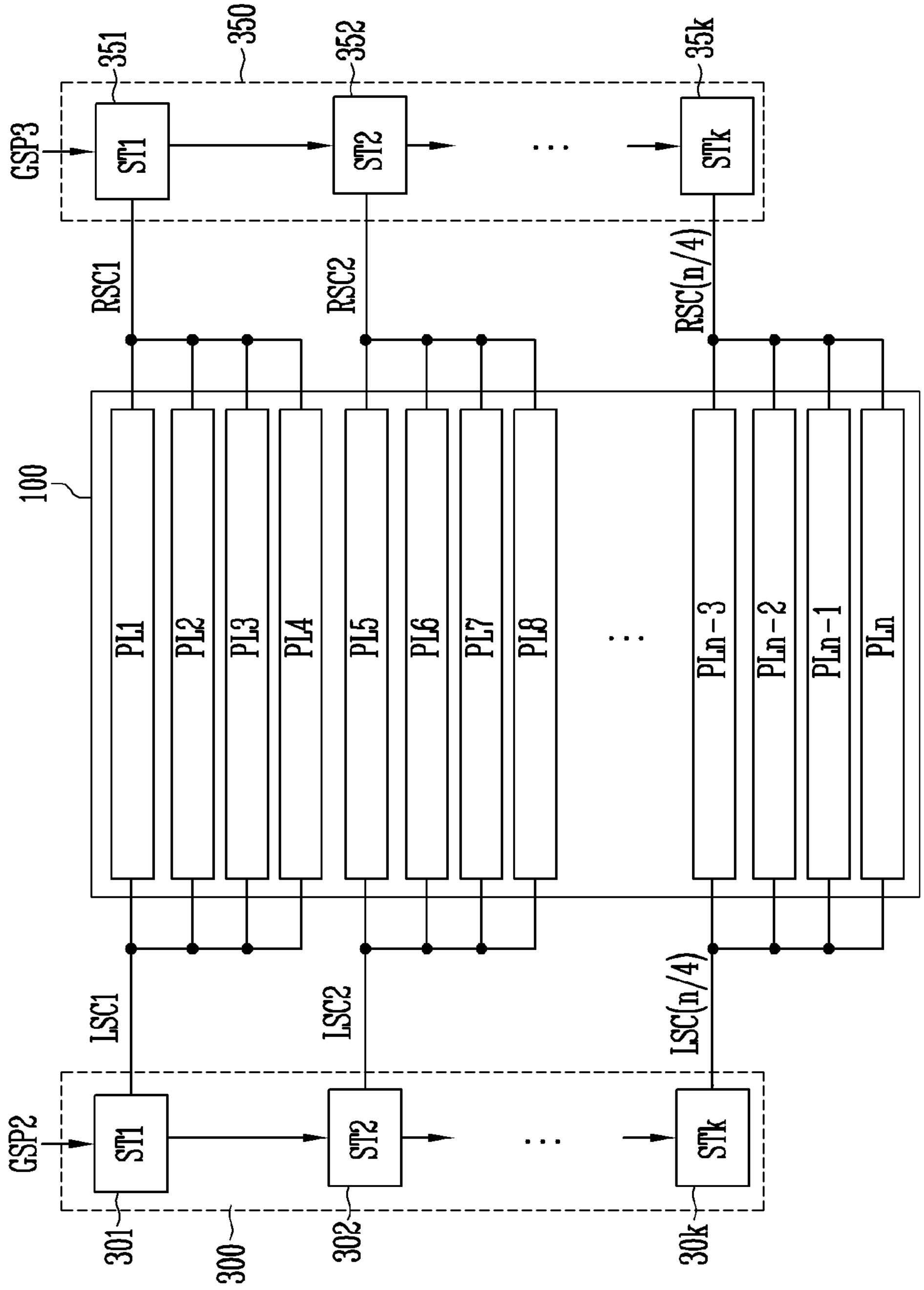
FIG. 18 is a block diagram illustrating exemplary embodiments of second and third scan drivers included in the display device of FIG. 17.
Figure 19:
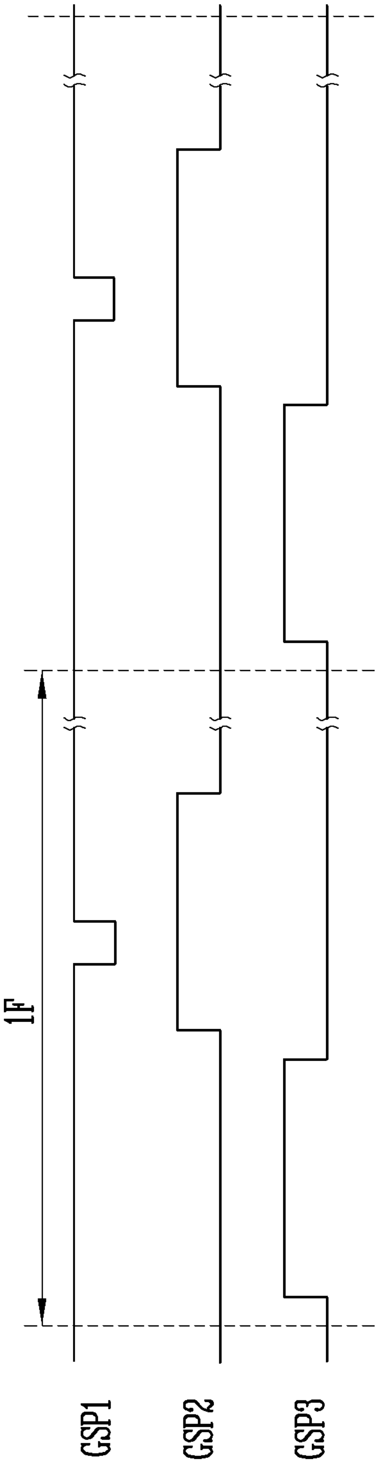
FIG. 19 is an exemplary timing diagram illustrating examples of gate start pulses to be supplied to scan drivers included in the display device of FIG. 17.

FIG. 18 is a block diagram illustrating exemplary embodiments of the second and third scan drivers included in the display device of FIG. 17. FIG. 19 is an exemplary timing diagram illustrating exemplary examples of gate start pulses to be supplied to the scan drivers included in the display device of FIG. 17.

Referring to FIGS. 17, 18, and 19, the second scan driver 300 may output second scan signals LSC1 to LSC(n/4) through the second scan lines S2. The third scan driver 350 may output third scan signals RSC1 to RSC(n/4) through the third scan lines S3.

The pixel unit 100 includes n pixel lines PL1 to PLn.

The second scan driver 300 includes k first stages 301 to 30*k* (k is a natural number less than n) which are dependently coupled to each other. The second scan driver 300 may shift a second gate start pulse GSP2 and supply the second gate start pulse GSP2 to the second scan lines S2. Each of the first stages 301 to 30*k* is coupled to a plurality of second scan lines S2. For example, as illustrated in FIG. 18, each of the first stages 301 to 30*k* may be coupled to four second scan lines S2. A second scan signal LSC1 output from the 1st first stage 301 may be simultaneously supplied to first to fourth pixel lines PL1 to PL4. Hence, the number of first stages 301 to 30*k* included in the second scan driver 300 may be reduced to ¼.

The third scan driver 350 includes k second stages 351 to 35*k* which are dependently coupled to each other. The third scan driver 350 may shift a third gate start pulse GSP3 and supply the third gate start pulse GSP3 to the third scan lines S3. Each of the second stages 351 to 35*k* is coupled to a plurality of third scan lines S3. For example, a third scan signal RSC1 output from the 1st second stage 351 may be simultaneously supplied to first to fourth pixel lines PL1 to PL4. Hence, the number of second stages 351 to 35*k* included in the third scan driver 350 may be reduced to ¼.

As described above, the third scan signals RSC1 to RSC(n/4) to be supplied to the fourth transistors M4 of the pixels PXL must be supplied earlier than the second scan signals LSC1 to LSC(n/4) to be supplied to the third transistors M3 of the pixels PXL. Therefore, supply timings of the second gate start pulse GSP2 and the third gate start pulse GSP3 may differ from each other. For example, the supply of the 1st second scan signal LSC1 may be delayed by approximately q horizontal periods (qH) compared to that of the 1st third scan signal RSC1.

Hence, the output of the second gate start pulse GSP2 from the timing controller 600A may be delayed by the q horizontal periods (qH) compared to that of the third gate start pulse GSP3. Here, the first gate start pulse GSP1 may overlap with a portion of the second gate start pulse GPS2.

As such, since scan signals to be supplied to the third and fourth transistors M3 and M4 are separately controlled, RC delay in the scan lines S1, S2, and S3 may be mitigated, and the image quality may be improved.

Figure 20:
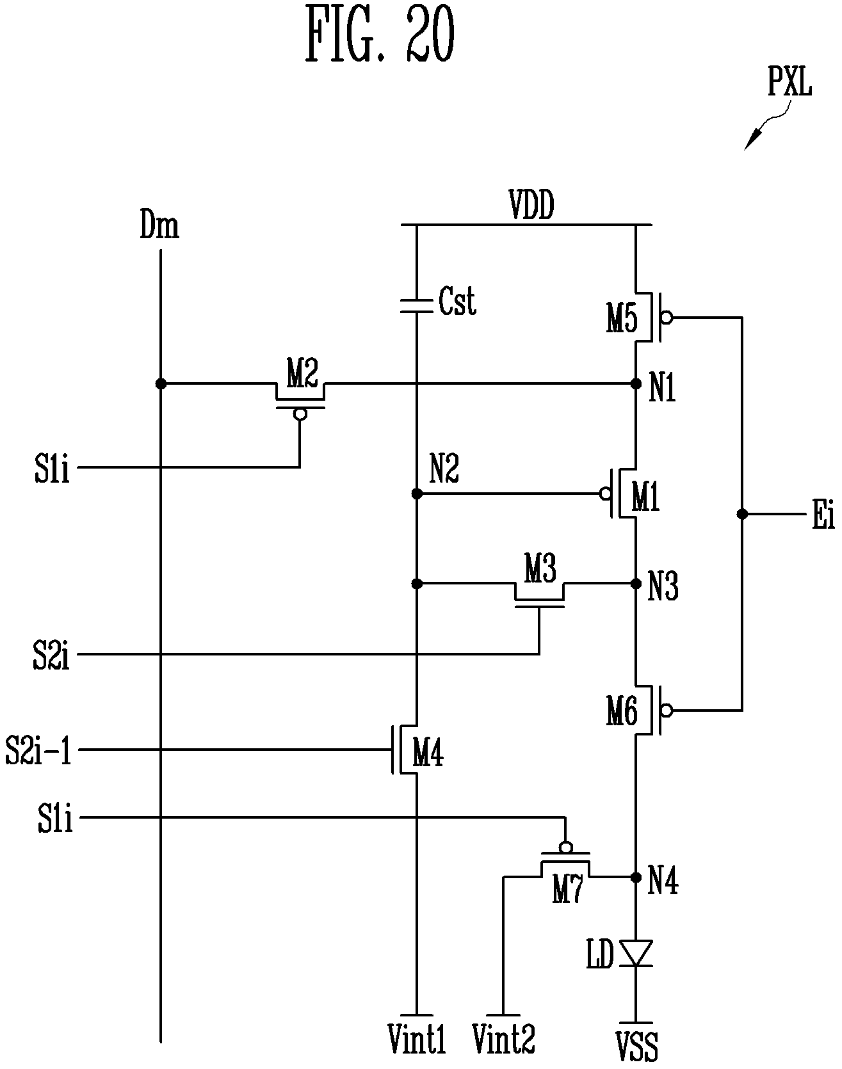
FIG. 20 is a circuit diagram illustrating an exemplary embodiment of a representative pixel included in the display device constructed according to principles of the invention.

FIG. 20 is a circuit diagram illustrating an exemplary embodiment of a representative pixel PXL included in the display device constructed according to principles of the invention.

A pixel in accordance with this embodiment and a method of driving the pixel, other than a seventh transistor and a scan signal for controlling the seventh transistor, are substantially the same as the pixels of FIG. 7 and the method of driving the pixel; therefore, the same reference numerals are used to designate the same or similar components as those of FIG. 7, and repetitive descriptions thereof will be omitted to avoid redundancy.

Referring to FIG. 20, the pixel PXL may include a light emitting element LD, first to seventh transistors M1 to M7, and a storage capacitor Cst.

Each of the third and fourth transistors M3 and M4 is formed of a N-type transistor. For example, each of the third transistor M3 and the fourth transistor M4 may be formed of an N-type oxide semiconductor transistor.

The seventh transistor M7 is formed of a P-type transistor. For example, the seventh transistor M7 is formed of a P-type poly-silicon semiconductor transistor.

In an embodiment, a gate electrode of the seventh transistor M7 may be coupled to an i-th first scan line S1*i*. The seventh transistor M7 may be turned on simultaneously with the second transistor M2.

However, this is only for illustrative purposes, and the gate electrode of the seventh transistor M7 may be coupled to the i−1-th first scan line S1*i*−1 or the i+1-th first scan line S1*i*+1. Hence, the timing of initializing the light emitting element LD may be adjusted.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:

pixels coupled to first scan lines, second scan lines, emission control lines, and data lines;

a first scan driver to supply a first scan signal to each of the first scan lines; and a second scan driver to supply a second scan signal to each of the second scan lines, wherein a pixel in an i-th horizontal line from among the pixels, i being a natural number, comprises:

a first transistor, as a drive transistor, coupled between a first node and a third node, and comprising a gate electrode coupled to a second node;

a second transistor coupled between a corresponding data line and the first node, and comprising a gate electrode coupled to an i-th first scan line from among the first scan lines;

a third transistor coupled between the second node and the third node, and comprising a gate electrode coupled to an i-th second scan line from among the second scan lines;

a fourth transistor coupled between the second node and a first initialization power supply, and comprising a gate electrode coupled to an i−1-th second scan line from among the second scan lines; and a storage capacitor coupled between a first power supply and the second node, and wherein the first scan driver is configured to supply the first scan signal to the i-th first scan line to turn on the second transistor, the second scan driver is configured to supply the second scan signal to the i-th second scan line to turn on the third transistor, and a turn-on level of the first scan signal is different from a turn-on level of the second scan signal.

2. The display device according to claim 1, wherein the pixel in the i-th horizontal line further comprises:

a fifth transistor coupled between the first power supply and the first node, and comprising a gate electrode coupled to an i-th emission control line;

a sixth transistor coupled between the third node and a fourth node, and comprising a gate electrode coupled to the i-th emission control line; and a light emitting element coupled between the fourth node and a second power supply.

3. The display device according to claim 1, wherein:

each of the first and second transistors comprises a P-type transistor; and each of the third and fourth transistors comprises an N-type oxide semiconductor transistor.

4. The display device according to claim 2, wherein each of the first, second, fifth, and sixth transistors comprises a low temperature poly-silicon (LTPS) transistor.

5. The display device according to claim 1, wherein the turn-on levels of the first scan signal and the second scan signal are opposite to each other.

6. A display device comprising:

pixels coupled to first scan lines, second scan lines, emission control lines, and data lines;

a first scan driver to supply a first scan signal to each of the first scan lines; and a second scan driver to supply a second scan signal to each of the second scan lines, wherein a pixel in an i-th horizontal line from among the pixels, i being a natural number, comprises:

a first transistor coupled between a first node and a third node, and comprising a gate electrode coupled to a second node;

a second transistor coupled between a corresponding data line and the first node, and comprising a gate electrode coupled to an i-th first scan line from among the first scan lines;

a third transistor coupled between the second node and the third node, and comprising a gate electrode coupled to an i-th second scan line from among the second scan lines;

a fourth transistor coupled between the second node and a first initialization power supply, and comprising a gate electrode coupled to an i−1-th second scan line from among the second scan lines;

a fifth transistor coupled between a first power supply and the first node, and comprising a gate electrode coupled to an i-th emission control line from among the emission control lines;

a sixth transistor coupled between the third node and a fourth node, and comprising a gate electrode coupled to the i-th emission control line;

a storage capacitor coupled between the first power supply and the second node;

a light emitting element coupled between the fourth node and a second power supply; and a seventh transistor coupled between a second initialization power supply and the fourth node, and comprising a gate electrode coupled to the i-th emission control line.

7. The display device according to claim 1, wherein the first scan driver is configured to supply the first scan signal at a first frequency to drive the display device at a first driving frequency, and supply the first scan signal at a second frequency to drive the display device at a second driving frequency lower than the first driving frequency.

8. The display device according to claim 7, wherein the second scan driver is configured to supply the second scan signal at the first frequency to drive the display device at the first driving frequency, and supply the second scan signal at the second frequency to drive the display device at the second driving frequency.

9. The display device according to claim 8, wherein the first frequency is substantially equal to the first driving frequency.

10. The display device according to claim 8, wherein the second frequency is substantially equal to the second driving frequency.

11. The display device according to claim 8, wherein, when the display device is driven at the second driving frequency, the first scan driver and the second scan driver are configured to supply the first scan signal and second scan signal, respectively, during a first period and wherein, when the display device is driven at the second driving frequency, the first scan driver and the second scan driver are configured not to supply the first scan signal and second scan signal, respectively, during a second period.

12. The display device according to claim 11, wherein the second period is longer than the first period.

13. The display device according to claim 6, wherein:

each of the fifth and sixth transistors comprises a P-type transistor; and the seventh transistor comprises an N-type oxide semiconductor transistor.

* * * * *